United States Patent
Somasundaran et al.

(10) Patent No.: US 9,836,985 B2
(45) Date of Patent: Dec. 5, 2017

(54) SYSTEMS AND METHODS FOR AUTOMATED SCORING OF TEXTUAL RESPONSES TO PICTURE-BASED ITEMS

(71) Applicant: Educational Testing Service, Princeton, NJ (US)

(72) Inventors: Swapna Somasundaran, Plainsboro, NJ (US); Martin Chodorow, New York, NY (US); Joel Tetreault, San Francisco, CA (US)

(73) Assignee: Educational Testing Service, Princeton, NJ (US)

( * ) Notice: Subject to any disclaimer, the term of this patent is extended or adjusted under 35 U.S.C. 154(b) by 289 days.

(21) Appl. No.: 14/633,314

(22) Filed: Feb. 27, 2015

(65) Prior Publication Data

US 2015/0243181 A1    Aug. 27, 2015

Related U.S. Application Data

(60) Provisional application No. 61/945,451, filed on Feb. 27, 2014, provisional application No. 61/955,967, filed on Mar. 20, 2014.

(51) Int. Cl.
  *G09B 7/02*  (2006.01)
  *G06F 17/27*  (2006.01)

(52) U.S. Cl.
  CPC ............ *G09B 7/02* (2013.01); *G06F 17/274* (2013.01)

(58) Field of Classification Search
  CPC ................................. G09B 7/02; G06F 17/274
  USPC ........................................................ 434/353
  See application file for complete search history.

(56) References Cited

U.S. PATENT DOCUMENTS

| | | | |
|---|---|---|---|
| 2010/0036654 A1* | 2/2010 | Futagi ................... | G06F 17/277 704/9 |
| 2010/0250238 A1* | 9/2010 | Deane ................... | G06F 17/277 704/9 |
| 2012/0323573 A1* | 12/2012 | Yoon ...................... | G09B 19/06 704/236 |

OTHER PUBLICATIONS

TOEIC: Speaking and Writing Sample Tests, Web Archive, Web. Oct. 27, 2011. <http://web.archive.org/web/20111027025544/http://www.ets.org/Media/Tests/TOEIC/pdf/TOEIC_sw_sample_tests.pdf>.*

Attali, Yigal, Burstein, Jill; Automated Essay Scoring With E-rater, v.2; Journal of Technology, Learning, and Assessment, 4(3); Feb. 2006.

(Continued)

*Primary Examiner* — Thomas Hong
(74) *Attorney, Agent, or Firm* — Jones Day

(57) ABSTRACT

Systems and methods are provided for measuring a user's English language proficiency. A constructed response generated by a user is received, the constructed response being based on a picture. The constructed response is processed to determine a first numerical measure indicative of a presence of one or more grammar errors in the constructed response. The constructed response is processed to determine a second numerical measure indicative of a degree to which the constructed response describes a subject matter of the picture. The constructed response is processed to determine a third numerical measure indicative of a degree of awkward word usage in the constructed response. A model is applied to the first, second, and third numerical measures to determine a score for the constructed response indicative of the user's English language proficiency. The model includes first, second, and third variables with associated first, second, and third weighting factors, respectively.

15 Claims, 10 Drawing Sheets

(56) References Cited

OTHER PUBLICATIONS

Bergsma, Shane, Lin, Dekang, Goebel, Randy; Web-Scale N-gram Models for Lexical Disambiguation; Proceedings of the 21st International Joint Conference on Artificial Intelligence; pp. 1507-1512; 2009.

Bergsma, Shane, Pitler, Emily, Lin, Dekang; Creating Robust Supervised Classifiers via Web-Scale N-gram Data; Proceedings of the 48th Annual Meeting of the Association for Computational Linguistics; pp. 865-874; 2010.

Chen, David, Dolan, William; Collecting Highly Parallel Data for Paraphrase Evaluation; Proceedings of the 49th Annual Meeting of the Association for Computational Linguistics; pp. 190-200; Jun. 2011.

Chodorow, Martin, Tetreault, Joel, Han, Na-Rae; Detection of Grammatical Errors Involving Prepositions; Proceedings of the 4th ACL-SIGSEM Workshop; pp. 25-30; 2007.

Coyne, Bob, Sproat, Richard; WordsEye: An Automatic Text-to-Scene Conversion System; Proceedings of the 28th Annual Conference on Computer Graphics and Interactive Techniques; pp. 487-496; 2001.

Dale, Robert; Narroway, George; A Framework for Evaluating Text Correction; LREC; pp. 3015-3018; 2012.

Dale, Robert, Anisimoff, Ilya, Narroway, George; HOO 2012: A Report on the Preposition and Determiner Error Correction Shared Task; Proceedings of the 7th Workshop on the Innovative Use of NLP for Building Educational Applications; pp. 54-62; Jun. 2012.

Ellis, Rod; Task-based Research and Language Pedagogy; Language Teaching Research, 4(3); pp. 193-220; 2000.

Feng, Yansong, Lapata, Mirella; How Many Words is a Picture Worth? Automatic Caption Generation for News Images; Proceedings of the 48th Annual Meeting of the Association for Computational Linguistics; pp. 1239-1249; Jul. 2010.

Feng, Yansong, Lapata, Mirella; Topic Models for Image Annotation and Text Illustration; Proceedings of the Human Language Technologies: The 2010 Annual Conference of the North American Chapter of the ACL; pp. 331-839; Jun. 2010.

Flor Michael; A Fast and Flexible Architecture for Very Large Word N-gram Datasets; Natural Language Engineering, 19(1); pp. 61-93; 2012.

Gamon, Michael; Using Mostly Native Data to Correct Errors in Learners' Writing: A Meta-Classifier Approach; Proceedings of the Annual Conference of the North American Chapter of the ACL; pp. 163-171; Jun. 2010.

Hassanali, Khairun-nisa; Liu, Yang, Solorio, Thamar; Using Latent Dirichlet Allocation for Child Narrative Analysis; Proceedings of the Workshop on Biomedical Natural Language Processing; pp. 111-115; Aug. 2013.

Howell, David; Statistical Methods for Psychology, 8th Ed.; Wadsworth: Belmont, CA; 2007.

Joshi, Dhiraj; Wang, James; Li, Jia; The Story Picturing Engine: A System for Automatic Text Illustration; ACM Transactions on Multimedia Computing, Communications and Applications, 2(1); pp. 1-22; Feb. 2006.

King, Levi, Dickinson, Markus; Shallow Semantic Analysis of Interactive Learner Sentences; Proceedings of the 8th Workshop on Innovative Use of NLP for Building Educational Applications; pp. 11-21; Jun. 2013.

Kulkarni, Girish, Premraj, Visruth, Ordonez, Vicente, Dhar, Sagnik, Li, Siming, Berg, Alexander, Berg, Tamara; BabyTalk: Understanding and Generating Simple Image Descriptions; IEEE Transactions on Pattern Analysis and Machine Intelligence, 35(12); pp. 2891-2903; Dec. 2013.

Kuznetsova, Polina, Ordonez, Vicente, Berg, Alexander, Berg, Tamara, Choi, Yejin; Collective Generation of Natural Image Descriptions; Proceedings of the 50th Annual Meeting of the Association for Computational Linguistics; pp. 359-368; 2012.

Leacock, Claudia, Chodorow, Martin; C-rater: Automated Scoring of Short-Answer Questions; Computers and the Humanities, 37(4); pp. 389-405; 2003.

Leacock, Claudia, Chodorow, Martin, Gamon, Michael, Tetreault, Joel; Automated Grammatical Error Detection for Language Learners; Synthesis Lectures on Human Language Technologies; 2010.

Lee, Choonkyu, Muresan, Smaranda, Stromswold, Karin; Computational Analysis of Referring Expressions in Narratives of Picture Books; Workshop on Computational Linguistics for Literature; pp. 1-7; Jun. 2012.

Leong, Chee Wee; Mihalcea, Rada, Hassan, Samer; Text Mining for Automatic Image Tagging; Proceedings of the 23rd International Conference on Computational Linguistics: Poster Volume; pp. 647-655; Aug. 2010.

Li, Siming, Kulkarni, Girish, Berg, Tamara, Berg, Alexander, Choi, Yejin; Composing Simple Image Descriptions Using Web-scale N-grams; Proceedings of the 15th Conference on Computational Natural Language Learning; pp. 220-228; 2011.

Meurers, Detmar, Ziai, Ramon, Ott, Niels, Bailey, Stacey; Integrating Parallel Analysis Modules to Evaluate the Meaning of Answers to Reading Comprehension Questions; International Journal of Continuing Engineering Education and Life Long Learning, 21(4); pp. 355-369; 2011.

Mitchell, Margaret, Dodge, Jesse, Goyal, Amit, Yamaguchi, Kota, Stratos, Karl, Han, Xufeng, Mensch, Alyssa, Berg, Alexander, Berg, Tamara, Daume, Hal; Midge: Generating Image Descriptions From Computer Vision Detections; Proceedings of the 13th Conference of the European Chapter of the Association for Computational Linguistics; pp. 747-756; 2012.

Rashtchian, Cyrus, Young, Peter, Hodosh, Micah, Hockenmaier, Julia; Collecting Image Annotations Using Amazon's Mechanical Turk; Proceedings of the NAACL HLT Workshop on Creating Speech and Language Data with Amazon's Mechanical Turk; pp. 139-147; Jun. 2010.

Snow, Catherine, Lawrence, Joshua, White, Claire; Generating Knowledge of Academic Language Among Urban Middle School Students; Journal of Research on Educational Effectiveness, 2; pp. 325-344; Oct. 2009.

Sukkarieh, Jana, Blackmore, John; C-rater: Automatic Content Scoring of Short Constructed Responses; Proceedings of the 22nd International FLAIRS Conference, Florida; pp. 290-295; 2009.

Von Ahn, Louis, Dabbish, Laura; Labeling Images with a Computer Game; Proceedings of the SIGCHI Conference on Human Factors in Computing Systems; pp. 319-326; 2004.

Xu, Wei, Tetreault, Joel, Chodorow, Martin, Grishman, Ralph, Zhao, Le; Exploiting Syntactic and Distributional Information for Spelling Correction with Web-scale N-gram Models; Proceedings of the Conference on Empirical Methods in Natural Language Processing; pp. 1291-1300; Jul. 2011.

Yao, Mo, Benjamin, Yang, Xiong, Lin, Liang, Lee, Mun Wai, Zhu, Song-Chun; I2T: Image Parsing to Text Description; Proceedings of the IEEE, 98(8); pp. 1485-1508; 2010.

Barr, Dale, Levy, Roger, Scheepers, Christoph, Tily, Harry; Random Effects Structure for Confirmatory Hypothesis Testing: Keep It Maximal; Journal of Memory and Language, 68(3); pp. 255-278; Apr. 2013.

Evanini, Keelan, Heilman, Michael, Wang, Xinhao, Blanchard, Daniel; Automated Scoring for TOEFL Junior Comprehensive Writing and Speaking; Technical Report: ETS; Princeton, NJ; 2014.

Forbes-McKay, K.E., Venneri, A.; Detecting Subtle Spontaneous Language Decline in Early Alzheimer's Disease with a Picture Description Task; Neurological Sciences, 26(4); pp. 243-254; Jul. 2005.

Lawless, Rene Sabatini, John, Deane, Paul; Approaches to Assessing Partial Vocabulary Knowledge and Supporting Word Learning; Roundtable Session at Annual Meeting of the American Educational Research Association, W. Nagy (Chairman); Apr. 2012.

Lawrence, J. Pare-Blagoev, E., Lawless, R., Deane, Paul, Li, C.; General Vocabulary, Academic Vocabulary, and Vocabulary Depth: Examining Predictors of Adolescent Reading Comprehension;

(56) References Cited

OTHER PUBLICATIONS

Annual Meeting of the American Educational Research Association; 2012.

* cited by examiner

Directions – Write a Sentence Based on a Picture.

In this part of the test, you will write ONE sentence that is based on a picture. With each picture you will be given TWO words or phrases that you must use in your sentence. You can change the forms of the words and you can use the words in any order.

Your sentences will be scored on

- the appropriate use of grammar, and
- the relevance of the sentence to the picture.

You will have 8 minutes to complete this part of the test.

Words

"Airport terminal" and "so"

| Grade 3: | The response consists of ONE sentence that:<br>• has no grammatical errors,<br>• contains forms of both keywords used appropriately, AND<br>• is consistent with the picture. |
|---|---|
| Grade 2: | The response consists of one or more sentences that:<br>• have one or more grammatical errors that do not obscure the meaning,<br>• contain BOTH keywords, (but they may not be in the same sentence and the form of the word(s) may not be accurate), AND<br>• are consistent with the picture |
| Grade 1: | The response:<br>• has errors that interfere with meaning,<br>• omits one or both keywords, OR<br>• is not consistent with the picture. |
| Grade 0: | The response is blank, written in a foreign language, or consists of keystroke characters. |

Instructions for generating reference corpus

List the items, setting, and events in the picture.

List one by one, all the items and events you see in the picture. These may be animate objects (e.g. man), inanimate objects (e.g. table) or events (e.g. dinner). Try to capture both the overall setting (restaurant), as well as the objects that make up the picture (e.g. man, table, food). These are generally (but not necessarily) nouns and noun phrases. Some pictures can have many items, while some have only a few. The goal is to list 10-15 Items and to capture as many items as possible, *starting with the most obvious ones*.

If the picture is too sparse, and you are not able to list at least 10 items, please indicate this as a comment. On the other hand, if you feel that more than 15 items need to be listed, you can do so by extending the list in the annotation text file.

Describe the picture

Describe the scene unfolding in the picture. The scene in the picture may be greater than the sum of its parts (many of which you will list in part-1). For example, the objects in a picture could be "shoe" "man" "chair," but the scene in the picture could be that of a shoe purchase. The description tries to recreate the scene (or parts of the scene) depicted in the picture.

Generate a paragraph of 5-7 sentences describing the picture. Some of these sentences will address what is going on, while some may address relations between items. The proportions of these will differ, based on the picture. Make sure that you generate at least one sentence containing the two seed words. If the picture is too simple, and you are not able to generate at least 5 sentences, please indicate this as a comment. On the other hand, if you feel that more than 7 sentences are needed to adequately capture a very densely populated picture, you can do so by extending the list in the annotation text file. Comment lines can be entered in the text file by starting the line with a #.

This is an example of a comment.

FIG. 6

SYSTEMS AND METHODS FOR AUTOMATED SCORING OF TEXTUAL RESPONSES TO PICTURE-BASED ITEMS

CROSS-REFERENCE TO RELATED APPLICATIONS

This application claims priority to U.S. Provisional Patent Application No. 61/945,451, filed Feb. 27, 2014, entitled "A System and Method for Automatically Scoring Picture-Based Short Constructed Responses in Vocabulary Tests for the Use This Word in a Sentence Project," and to U.S. Provisional Patent Application No. 61/955,967, filed Mar. 20, 2014, entitled "Automated Measures of Specific Vocabulary Knowledge from Constructed Responses," both of which are herein incorporated by reference in their entireties.

FIELD

The technology described in this patent document relates generally to computer-based test scoring systems and more particularly to a system and method for automatically scoring a constructed response to a picture-based item.

BACKGROUND

To evaluate the understanding, comprehension, or skill of students in an academic environment, the students are tested. Typically, educators rely on multiple-choice examinations to evaluate students. Multiple-choice examinations quickly provide feedback to educators on the students' progress. However, multiple-choice examinations may reward students for recognizing an answer versus constructing or recalling an answer. Thus, another method of evaluating students utilizes test questions that require a constructed response. Examples of constructed responses include free-form, non-multiple choice responses such as essays or show-your-work math responses. For some educators, use of a constructed response examination is preferred versus a multiple-choice examination because the constructed response examination requires the student to understand and articulate concepts in the tested subject matter. However, a length of time required to grade a constructed response may be considerable.

SUMMARY

The present disclosure is directed to a computer-implemented method, system, and non-transitory computer-readable storage medium for measuring a user's English language proficiency. In an example computer-implemented method of measuring a user's English language proficiency, a constructed response generated by a user is received, the constructed response being based on a picture. The constructed response is parsed with a processing system to generate a set of individual words associated with the constructed response. The constructed response is processed with the processing system to identify in the constructed response a plurality of multi-word sequences. The constructed response is processed with the processing system to determine a first numerical measure indicative of a presence of one or more grammar errors in the constructed response. The set of individual words and a reference corpus are processed with the processing system to determine a second numerical measure indicative of a degree to which the constructed response describes a subject matter of the picture. Each word of the set of individual words is compared to individual words of the reference corpus to determine the second numerical measure, the reference corpus having been designated as representative of the subject matter. The plurality of multi-word sequences and an n-gram dataset are processed with the processing system to determine a third numerical measure indicative of a degree of awkward word usage in the constructed response. Each of the multi-word sequences is searched across entries of the n-gram dataset to determine the third numerical measure, where each entry of the n-gram dataset includes an English word n-gram and an associated statistical association score. A model is applied to the first numerical measure, the second numerical measure, and the third numerical measure to determine a score for the constructed response indicative of the user's English language proficiency. The model includes a first variable and an associated first weighting factor, the first variable receiving a value of the first numerical measure. The model also includes a second variable and an associated second weighting factor, the second variable receiving a value of the second numerical measure. The model further includes a third variable and an associated third weighting factor, the third variable receiving a value of the third numerical measure.

An example system for measuring a user's English language proficiency includes a processing system and a computer-readable memory in communication with the processing system. The computer-readable memory is encoded with instructions for commanding the processing system to execute steps. In executing the steps, a constructed response generated by a user is received, the constructed response being based on a picture. The constructed response is parsed to generate a set of individual words associated with the constructed response. The constructed response is processed to identify in the constructed response a plurality of multi-word sequences. The constructed response is processed to determine a first numerical measure indicative of a presence of one or more grammar errors in the constructed response. The set of individual words and a reference corpus are processed to determine a second numerical measure indicative of a degree to which the constructed response describes a subject matter of the picture. Each word of the set of individual words is compared to individual words of the reference corpus to determine the second numerical measure, the reference corpus having been designated as representative of the subject matter. The plurality of multi-word sequences and an n-gram dataset are processed to determine a third numerical measure indicative of a degree of awkward word usage in the constructed response. Each of the multi-word sequences is searched across entries of the n-gram dataset to determine the third numerical measure, where each entry of the n-gram dataset includes an English word n-gram and an associated statistical association score. A model is applied to the first numerical measure, the second numerical measure, and the third numerical measure to determine a score for the constructed response indicative of the user's English language proficiency. The model includes a first variable and an associated first weighting factor, the first variable receiving a value of the first numerical measure. The model also includes a second variable and an associated second weighting factor, the second variable receiving a value of the second numerical measure. The model further includes a third variable and an associated third weighting factor, the third variable receiving a value of the third numerical measure.

In an example non-transitory computer-readable storage medium for measuring a user's English language proficiency, the computer-readable storage medium includes computer executable instructions which, when executed, cause a processing system to execute steps. In executing the steps, a constructed response generated by a user is received, the constructed response being based on a picture. The constructed response is parsed to generate a set of individual words associated with the constructed response. The constructed response is processed to identify in the constructed response a plurality of multi-word sequences. The constructed response is processed to determine a first numerical measure indicative of a presence of one or more grammar errors in the constructed response. The set of individual words and a reference corpus are processed to determine a second numerical measure indicative of a degree to which the constructed response describes a subject matter of the picture. Each word of the set of individual words is compared to individual words of the reference corpus to determine the second numerical measure, the reference corpus having been designated as representative of the subject matter. The plurality of multi-word sequences and an n-gram dataset are processed to determine a third numerical measure indicative of a degree of awkward word usage in the constructed response. Each of the multi-word sequences is searched across entries of the n-gram dataset to determine the third numerical measure, where each entry of the n-gram dataset includes an English word n-gram and an associated statistical association score. A model is applied to the first numerical measure, the second numerical measure, and the third numerical measure to determine a score for the constructed response indicative of the user's English language proficiency. The model includes a first variable and an associated first weighting factor, the first variable receiving a value of the first numerical measure. The model also includes a second variable and an associated second weighting factor, the second variable receiving a value of the second numerical measure. The model further includes a third variable and an associated third weighting factor, the third variable receiving a value of the third numerical measure.

The present disclosure is also directed to a computer-implemented method, system, and non-transitory computer-readable storage medium for constructing a model to measure a user's English language proficiency as presented in a constructed response generated by the user, the constructed response being based on a given picture. In an example computer-implemented method of constructing a model to measure a user's English language proficiency as presented in a constructed response generated by the user, the constructed response being based on a given picture, a model associated with the given picture is specified. The model includes a first variable and an associated first weighting factor, the first variable indicative of a presence of one or more grammar errors included in the constructed response. The model also includes a second variable and an associated second weighting factor, the second variable indicative of a degree to which the constructed response describes a subject matter of the given picture as determined based on a reference corpus designated as representative of the subject matter. The model further includes a third variable and an associated third weighting factor, the third variable indicative of a degree of awkward word usage in the constructed response as determined based on an n-gram dataset. The n-gram dataset has entries including an English word n-gram and an associated statistical association measure. A plurality of reference responses for the given picture are received, each reference response having been given a reference score. The reference responses span a range of reference scores reflecting varying degrees of English language proficiency, and the reference responses have been accepted as usable for training the model. The model is trained with a processing system using the reference responses and the given reference scores to determine values for each of the first, second and third weighting factors. The model is configured with the determined values of the first, second and third weighting factors to receive a first numerical measure, a second numerical measure, and a third numerical measure for the first variable, second variable, and third variable, respectively. The first, second, and third numerical measures are associated with an actual constructed response to be scored so as to generate a score for the actual constructed response that is indicative of the user's English language proficiency as presented in the actual constructed response generated by the user.

An example system for constructing a model to measure a user's English language proficiency as presented in a constructed response generated by the user, the constructed response being based on a given picture, includes a processing system and a computer-readable memory in communication with the processing system. The computer-readable memory is encoded with instructions for commanding the processing system to execute steps. In executing the steps, a model associated with the given picture is specified. The model includes a first variable and an associated first weighting factor, the first variable indicative of a presence of one or more grammar errors included in the constructed response. The model also includes a second variable and an associated second weighting factor, the second variable indicative of a degree to which the constructed response describes a subject matter of the given picture as determined based on a reference corpus designated as representative of the subject matter. The model further includes a third variable and an associated third weighting factor, the third variable indicative of a degree of awkward word usage in the constructed response as determined based on an n-gram dataset. The n-gram dataset has entries including an English word n-gram and an associated statistical association score. A plurality of reference responses for the given picture are received, each reference response having been given a reference score. The reference responses span a range of reference scores reflecting varying degrees of English language proficiency, and the reference responses have been accepted as usable for training the model. The model is trained using the reference responses and the given reference scores to determine values for each of the first, second and third weighting factors. The model is configured with the determined values of the first, second and third weighting factors to receive a first numerical measure, a second numerical measure, and a third numerical measure for the first variable, second variable, and third variable, respectively. The first, second, and third numerical measures are associated with an actual constructed response to be scored so as to generate a score for the actual constructed response that is indicative of the user's English language proficiency as presented in the actual constructed response generated by the user.

An example non-transitory computer-readable storage medium for constructing a model to measure a user's English language proficiency as presented in a constructed response generated by the user, the constructed response being based on a given picture, includes computer executable instructions. When executed, the computer executable instructions cause a processing system to execute steps. In executing the steps, a model associated with the given picture is specified. The model includes a first variable and an associated first weighting factor, the first variable indicative of a presence of one or more grammar errors included in the constructed response. The model also includes a second variable and an associated second weighting factor, the second variable indicative of a degree to which the constructed response describes a subject matter of the given picture as determined based on a reference corpus designated as representative of the subject matter. The model further includes a third variable and an associated third weighting factor, the third variable indicative of a degree of awkward word usage in the constructed response as determined based on an n-gram dataset. The n-gram dataset has entries including an English word n-gram and an associated statistical association score. A plurality of reference responses for the given picture are received, each reference response having been given a reference score. The reference responses span a range of reference scores reflecting varying degrees of English language proficiency, and the reference responses have been accepted as usable for training the model. The model is trained using the reference responses and the given reference scores to determine values for each of the first, second and third weighting factors. The model is configured with the determined values of the first, second and third weighting factors to receive a first numerical measure, a second numerical measure, and a third numerical measure for the first variable, second variable, and third variable, respectively. The first, second, and third numerical measures are associated with an actual constructed response to be scored so as to generate a score for the actual constructed response that is indicative of the user's English language proficiency as presented in the actual constructed response generated by the user.

BRIEF DESCRIPTION OF THE DRAWINGS

FIG. 2 depicts an example picture-based test item that is provided to a user.

FIG. 4 depicts an example grading rubric used by a human grader in grading a textual response to a picture-based item.

FIG. 6 illustrates an example protocol for generating a reference corpus.

DETAILED DESCRIPTION

Figure 1:
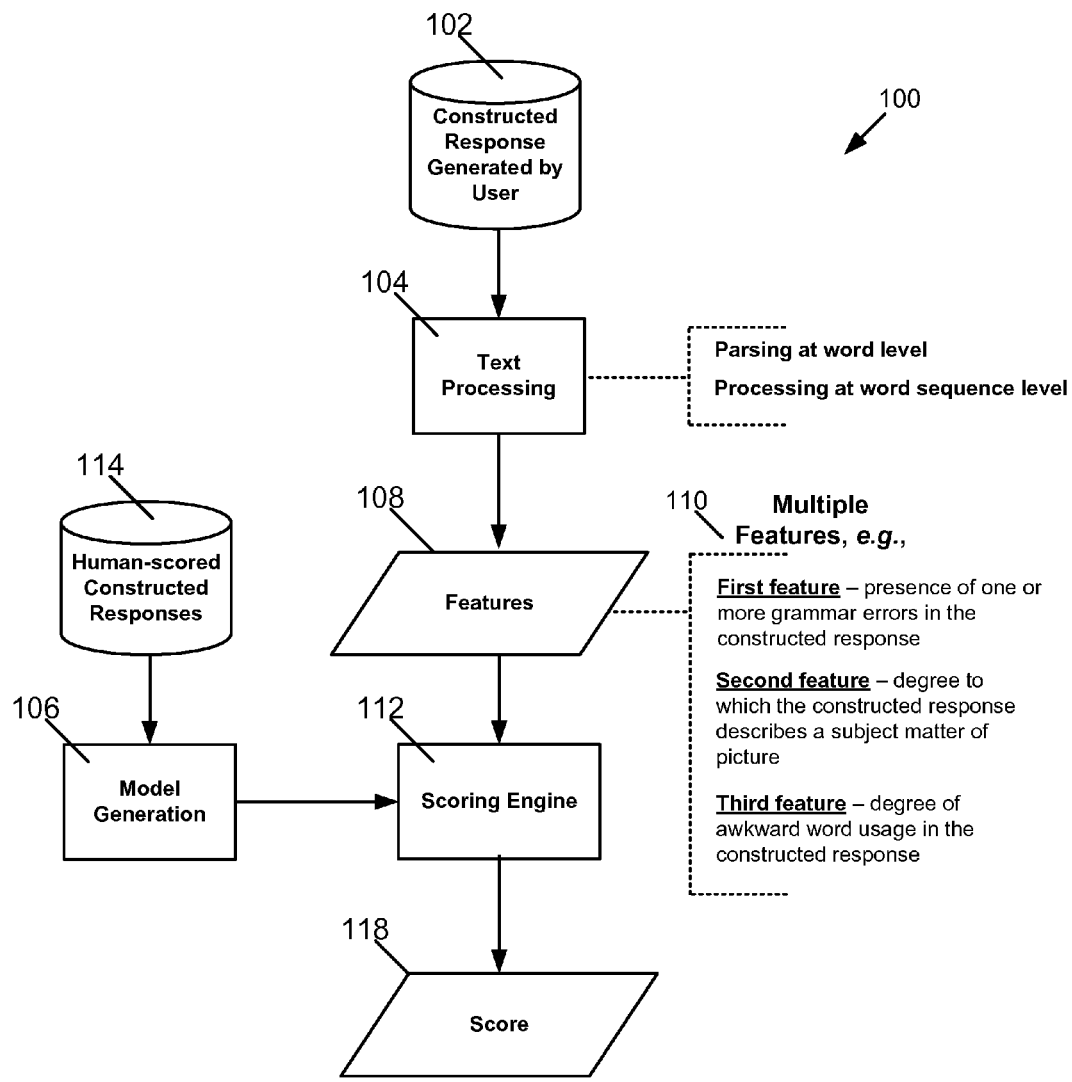
FIG. 1 is a block diagram illustrating an example system for measuring a user's English language proficiency.

FIG. 1 is a block diagram 100 illustrating an example system for measuring a user's English language proficiency. To measure the user's English language proficiency, the example system of FIG. 1 comprises a computer-based system for automatically scoring a constructed response 102 generated by the user, where the constructed response 102 is based on a picture. In an example, the constructed response 102 is a textual response that is provided by the user in response to a picture-based item. In an example, the picture-based item presents a picture to the user, e.g., a photograph or illustration, and a prompt requests that the user generate a constructed response that describes the picture. In the example, the user is a human that generates the constructed response 102. An example picture-based item is described below with reference to FIG. 2. In an example, the picture-based item is a "write a sentence based on a picture" task that is included in the Test of English for International Communication (TOEIC) test.

In an example, the picture-based item presented to the user is used in assessing the user's English language proficiency (e.g., the user's ability to construct a properly-formed sentence in the English language), as presented in the constructed response 102. In other examples, the picture-based item presented to the user is used in assessing, specifically, the user's vocabulary knowledge. In an example, the picture-based item presents a picture to the user and one or more keywords. The picture-based item in this example may include a prompt that requests that the user generate a constructed response that (i) includes each of the one or more keywords, and (ii) describes the picture. The user's usage of the one or more keywords in the constructed response may be evaluated to assess the user's understanding of the meaning of those keywords.

The constructed response 102 generated by the user is received at a text processing module 104 of the computer-based system, in an embodiment. Text processing performed on the constructed response 102 at the text processing module 104 may include parsing the constructed response 102 with a processing system to generate a set of individual words associated with the constructed response 102. The text processing performed at the text processing module 104 may further include processing the constructed response 102 with the processing system to identify in the constructed response 102 a plurality of multi-word sequences (e.g., adjacent word pairs, adjacent word triples, etc.). Such parsing and processing may be carried out using conventional automated, computer-based text parsing algorithms known to those of ordinary skill in the art. Various other processing and analysis may be performed on the constructed response 102 at the text processing module 104, such as correction of spelling errors in the constructed response 102, using conventional automated, computer-based algorithms known to those of ordinary skill in the art. The use of spelling correction algorithms can be beneficial to improve the quality of the assessment being carried out by reducing the likelihood of complications in the assessment caused by the presence of spelling errors.

The text processing and analysis performed at the text processing module 104 is used to extract one or more features 108 from the constructed response 102. In an example, the one or more features 108 include numerical measures or Boolean values that are representative of aspects of the constructed response 102. The text processing module 104 may extract example features 110 from the constructed response 102. The example features 110 may include the first, second, and third features illustrated in FIG. 1. As shown in FIG. 1, the first example feature indicates a presence of one or more grammar errors in the constructed response 102. The first feature may be determined by processing the constructed response 102 with a processing system to determine a first numerical measure indicative of the presence of the one or more grammar errors for the first feature.

In an example, the first numerical measure indicative of the presence of the one or more grammar errors is determined based on a statistical computer model. The statistical computer model may be trained using a large corpus of edited text, thus allowing the statistical computer model to extract and count sequences of adjacent words and part-of-speech pairs (e.g., n-grams, bigrams, trigrams, etc.) from the corpus. The trained statistical computer model can then be used to search a constructed response for bigrams that would occur much less often than would be expected using frequencies determined based on the large corpus of text. Specifically, as described in "Criterion$^{SM}$ Online Essay Evaluation: An Application for Automated Evaluation of Student Essays," by J. Burstein et al., presented at the Fifteenth Annual Conference on Innovative Applications of Artificial Intelligence, Acapulco, Mexico, August 2003, which is incorporated herein by reference in its entirety, every word in the corpus may be tagged with its part of speech using computer-based algorithms known to those of ordinary skill in the art, in an embodiment. After tagging the corpus in this manner, frequencies may be collected for (i) each tag, (ii) each function word (e.g., determiners, prepositions, etc.), and/or (iii) each adjacent pair of tags and function words. The individual tags and words are unigrams, and the adjacent pairs are bigrams. Higher order n-grams may also be used. To detect violations of English grammar rules, the statistical computer model may then be used to search a constructed response for n-grams, e.g., bigrams that occur much less often than would be expected based on the collected frequencies. The n-grams, e.g., bigrams that occur much less often than expected may provide evidence of a grammatical error. In examples, the statistical computer model may determine the first numerical measure indicative of the presence of the one or more grammar errors based on other measures (e.g., the statistical computer model may include "filters," which account for low probability, but nonetheless grammatical word sequences, etc.).

The second example feature of the example features 110 indicates a degree to which the constructed response 102 describes a subject matter of the picture. The second feature is determined by processing (i) the set of individual words identified by the text processing module 104, and (ii) a reference corpus with the processing system to determine a second numerical measure for the second feature. In an example, the processing includes comparing each word of the set of individual words to individual words of the reference corpus to determine the second numerical measure, where the reference corpus has been designated as representative of the subject matter of the picture. In this example, the comparison provides a measure of the word overlap between the constructed response 102 and the reference corpus, and this word overlap is utilized in determining the second numerical measure.

The third example feature of the example features 110 indicates a degree of awkward word usage in the constructed response 102. In an example, the third feature is determined by processing (i) the plurality of multi-word sequences identified by the text processing module 104, and (ii) an n-gram dataset (e.g., a dataset from the Trendstream database) with the processing system to determine a third numerical measure for the third feature. In an example, the processing includes searching each of the multi-word sequences across entries of the n-gram dataset to determine the third numerical measure. Each entry of the n-gram dataset includes an English word n-gram and an associated statistical association score, in an embodiment. In an example, the statistical association score is a Pointwise Mutual Information (PMI) value that accounts for (i) the probability that members of an n-gram will occur together in a well-formed text, and (ii) the probabilities that members of the n-gram will occur independently in a well-formed text. In other examples, a PMI value is not used, and the statistical association score comprises a different measure of association. In another example, each entry of the n-gram dataset includes the English word n-gram and an associated raw frequency count, where the raw frequency count indicates a number of times the n-gram appears in the n-gram dataset.

The searching of the multi-word sequences across the entries of the n-gram dataset may be used to a return a value indicating a probability of a multi-word sequence appearing in a well-formed text. Information on the probabilities for each of the multi-word sequences identified in the constructed response 102 may be used in determining the third numerical measure indicative of the degree of awkward word usage in the constructed response 102.

The text processing module 104 may extract features other than the example features 110. The other features extracted from the constructed response 102 may include, for example, features that are based on the prompt of the picture-based item. For example, if the prompt of the picture-based item requests that the user include one or more keywords in the constructed response 102, then the text processing module 104 may extract a feature that indicates whether all of the one or more keywords are included in the constructed response 102. In other examples, the text processing module 104 may extract various other features from the constructed response 102.

The one or more features 108 extracted from the constructed response 102 are received at a scoring engine 112. The scoring engine 112 includes an automated scoring system configured to determine a score 118 for the constructed response 102 that measures the user's English language proficiency or vocabulary knowledge as presented in the constructed response 102. The score 118 may be a point score (e.g., 87 points out of 110 points possible), a percentage or decimal score (e.g., 95% correct), a classification (e.g., "high," "medium," "low," etc.), or a ranking, for example. In an example, the automated scoring system is a computer-based system for automatically scoring the constructed response 102 that requires no human intervention or minimal human intervention. The scoring engine 112 may determine the score 118 for the constructed response 102 based on the features 108 extracted from the constructed response 102 and a scoring model. The scoring model includes weighting factors for the extracted features 108, and the weighting factors are determined based on a plurality of human-scored constructed responses 114. The scoring model may also be referred to as a "scoring equation."

The scoring model may be a numerical model that is applied to the extracted features 108 to determine the score 118. In an example, where the first, second, and third features 110 are extracted from the constructed response 102, the scoring model includes a first variable and an associated first weighting factor, a second variable and an associated second weighting factor, and a third variable and an associated third weighting factor. The first variable receives a value of the first feature, the second variable receives a value of the second feature, and the third variable receives a value of the third feature. By applying the scoring model to the first, second, and third features in this manner, the score 118 for the constructed response 102 that is indicative of the user's English language proficiency or vocabulary knowledge as presented in the constructed response 102 is determined.

To generate the scoring model used in the scoring engine 112, a model generation module 106 may be used. The model generation module 106 receives the plurality of human-scored constructed responses 114 with associated scores for each of the constructed responses 114 and uses the plurality of human-scored constructed responses 114 to determine the weighting factors for the model, e.g., through a regression analysis. The plurality of human-scored constructed responses 114 may span a range of reference scores reflecting varying degrees of English language proficiency and/or vocabulary knowledge, and the constructed responses 114 may be scored constructed responses that have been accepted as usable for training the scoring model. In an example, the weighting factors of the model are determined via a machine learning application trained based on the plurality of human-scored constructed responses 114. Specifically, the machine learning application may be a logistic regression classifier (e.g., a logistic regression classifier trained using the "sklearn" tool known to those of ordinary skill in the art) or another suitable machine learning application. In another example, the machine learning application may utilize a random forest learning algorithm known to those of ordinary skill in the art. As illustrated in FIG. 1, the model generation module 106 provides the model to the scoring engine 112.

Human-scored constructed responses (i.e., such as the responses 114 of FIG. 1) may be referred to herein as "reference responses." It should be appreciated that such "reference responses" are different from the "reference corpuses" described herein. As referred to herein, a "reference corpus" is a text corpus that has been designated as representative of a subject matter of a picture. In an example, the reference corpus is intended to be a comprehensive textual representation of the picture. An example protocol for generating a reference corpus is described below with reference to FIG. 6. By contrast, as referred to herein, a "reference response" is a response to an item (i) that has been given a reference score, and (ii) that may be used in training a scoring model (e.g., to determine the weighting factors of the scoring model). In an example, the reference score is assigned to the reference response by one or more human graders.

With the scoring model in place, the constructed response 102 may be scored by applying the scoring model as noted above. The score 118 for the constructed response 102 measures the user's English language proficiency as presented in the constructed response 102. In an example, the score 118 specifically measures the user's vocabulary knowledge (e.g., as in examples where the picture-based item requests that the user generate a constructed response that describes a picture and includes one or more vocabulary words). It should be appreciated that under the approaches described herein, one or more computer-based models are used in determining the score 118 for the constructed response 102. As described above, such computer-based models are trained via a machine-learning application (e.g., a logistic regression classifier, random forest learner, etc.) in order to determine weighting factors for the models. By contrast, conventional human scoring techniques for determining a score for a constructed response include none of these steps. Conventional human scoring techniques involve one or more human graders reviewing constructed responses and manually assigning scores to the constructed responses.

FIG. 2 depicts an example picture-based test item 200 that is provided to a user. As described above with reference to FIG. 1, a computer-based system is used to automatically score a constructed response 102, where the constructed response 102 is a constructed response provided by the user in response to a picture-based test item. The picture-based test item 200 is an example of such a picture-based test item and includes a picture 206, keywords 208, and directions 204. As indicated in the directions 204, the example picture-based test item 200 requests that the user generate a constructed response that is based on the picture 206 and that includes the given keywords 208 (e.g., "Directions—Write a Sentence Based on a Picture. In this part of the test, you will write ONE sentence that is based on a picture. With each picture you will be given TWO words or phrases that you must use in your sentence. You can change the forms of the words and you can use the words in any order," as illustrated in FIG. 2).

The directions 204 of the example picture-based test item 200 further state that the constructed response will be scored based the user's use of grammar in the constructed response and the relevance of the constructed response to the picture (e.g., "Your sentences will be scored on the appropriate use of grammar, and the relevance of the sentence to the picture," as illustrated in FIG. 2). The example directions 204 further provide that the user has a certain amount of time to write the constructed response (e.g., "You will have 8 minutes to complete this part of the test.," as illustrated in FIG. 2).

It is noted that the picture-based test item 200 of FIG. 2 is only an example. Other picture-based test items may include multiple pictures and may request that the user generate a constructed response that is longer than a single sentence. In one example, the picture-based item presents a series of pictures to the user, and a prompt requests that the user write one or more paragraphs that describe the series of pictures. In other examples, the picture-based test item 200 may include less detailed instructions or more detailed instructions. For instance, in an example, the picture-based test item 200 may merely request that the user write about the picture 206 and not request that the user include any vocabulary words keywords in his or her response.

The directions of the picture-based test item may be configured in any suitable way in other examples to elicit evidence from the user that is used in performing automated scoring on the user's constructed response. For example, the particular directions 204 of FIG. 2 may be configured, specifically, to elicit evidence related to automated scoring using features shown at reference numeral 552 of FIG. 5, which are described below in greater detail.

Figure 3:
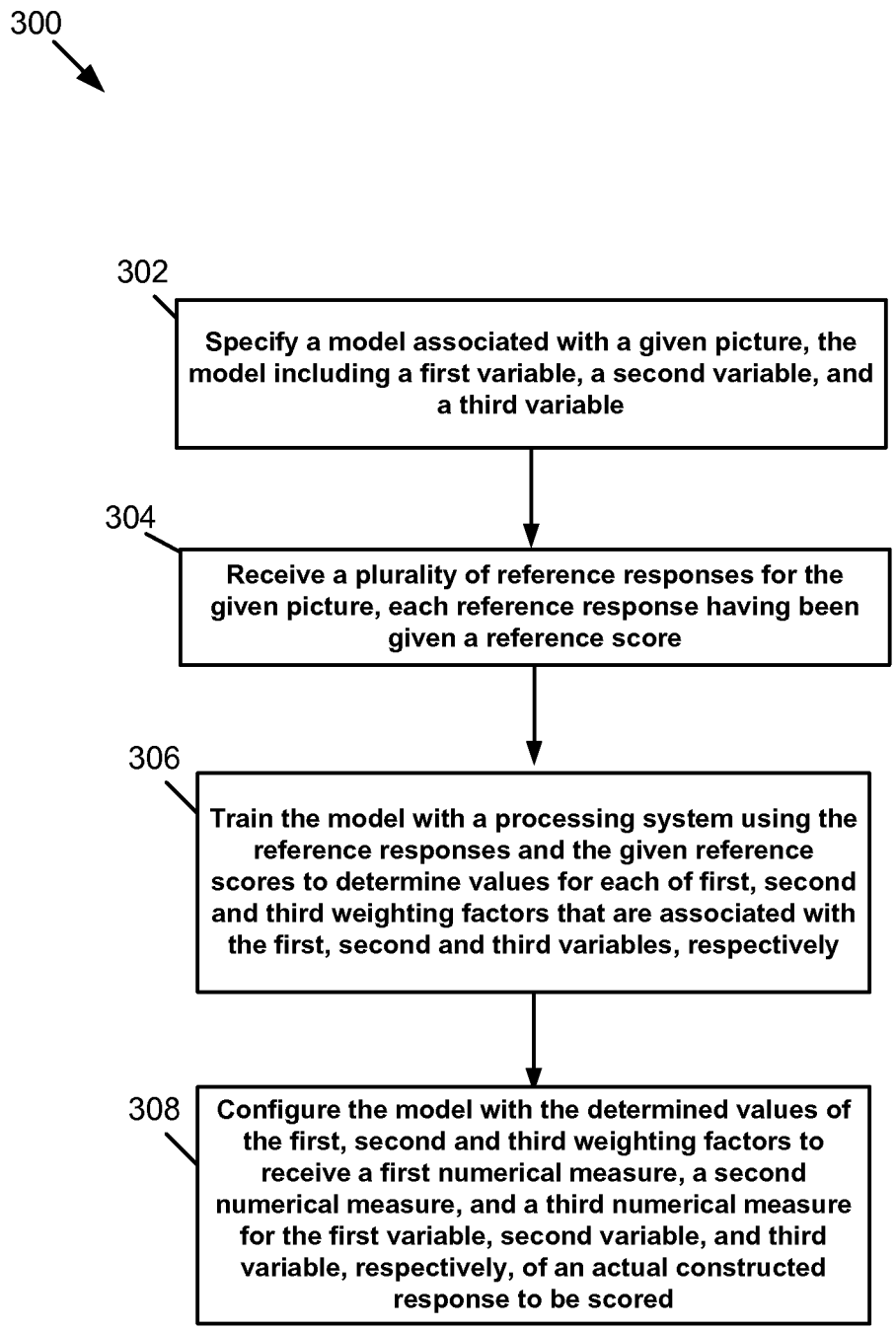
FIG. 3 is a flowchart depicting operations of an example method for constructing a model to measure a user's English language proficiency as presented in a constructed response generated by the user, the constructed response being based on a given picture.

FIG. 3 is a flowchart 300 depicting operations of an example method for constructing a model to measure a user's English language proficiency as presented in a constructed response generated by the user, the constructed response being based on a given picture. As described above with reference to FIG. 1, a model generation module 106 receives the plurality of human-scored constructed responses 114 and uses the plurality of human-scored constructed responses 114 to determine weighting factors of the model. The example operations depicted in the flowchart 300 of FIG. 3 provide further details on the building of such a model.

At 302, a model associated with the given picture is specified. The model includes a first variable and an associated first weighting factor, the first variable indicative of a presence of one or more grammar errors included in the constructed response. The model also includes a second variable and an associated second weighting factor, the second variable indicative of a degree to which the constructed response describes a subject matter of the given picture as determined based on a reference corpus designated as representative of the subject matter. The model further includes a third variable and an associated third weighting factor, the third variable indicative of a degree of awkward word usage in the constructed response as determined based on an n-gram dataset. The n-gram dataset may have entries including an English word n-gram and an associated statistical association score (e.g., a PMI value). In other examples, the model includes additional variables and weighting factors, fewer variables and weighting factors, or different variables and weighting factors. For instance, the model may include variables and weighting factors that are based on one or more features of the features 552 of FIG. 5 (described in further detail below).

At 304, a plurality of reference responses for the given picture are received, each reference response having been given a reference score. The reference responses may span a range of reference scores reflecting varying degrees of English language proficiency, and the reference responses may have been accepted as usable for training the model. In an example, the reference scores given to the plurality of reference responses are assigned by one or more human graders. The scores assigned by the one or more human graders may be point scores (e.g., 87 points out of 110 points possible), percentages or decimal scores (e.g., 95% correct), or classifications (e.g., "high," "medium," "low," etc.), for example. The scores assigned by the one or more human graders may be based on a grading rubric, such as the example grading rubric 400 of FIG. 4.

With reference to FIG. 4, the example grading rubric 400 may be designed for use in grading a constructed response that is provided by a user in response to the example picture-based test item 200 of FIG. 2. As described above, the picture-based test item 200 of FIG. 2 includes a picture, two keywords, and a prompt that requests that the user generate a constructed response that is based on the picture and that includes the two keywords. The example grading rubric 400 is based on a four point scale, as illustrated in FIG. 4. To receive a score of "3" (i.e., a highest score), a constructed response should include a single sentence that has no grammatical errors, contains forms of both keywords, and is consistent with the picture. To receive a score of "2," a constructed response should include one or more sentences that have one or more grammatical errors that do not obscure the meaning of the response, contain both of the keywords (e.g., where the keywords may not be in the same sentence, and the form of the keywords may not be accurate), and are consistent with the picture.

As is further illustrated in the example grading rubric of FIG. 4, to receive a score of "1," a constructed response should have errors that interfere with the meaning of the response, omit one or both keywords, or be inconsistent with the picture. To receive a score of "0" (i.e., a lowest score), a constructed response should be blank, written in a foreign language, or consist only of random keystroke characters that do not form words.

With reference again to FIG. 3, at 306, the model is trained with a processing system using the reference responses and the given reference scores to determine values for each of the first, second, and third weighting factors. As explained above, in other examples, the model may include additional variables and weighting factors, fewer variables and weighting factors, or different variables and weighting factors. Thus, the training of the scoring model is used to determine values for the particular weighting factors that are being used with the model, which may include the first, second, and third weighting factors or other weighting factors.

The training of the model may include processing each of the reference responses to determine for each reference response a first numerical measure, a second numerical measure, and a third numerical measure. The first numerical measure indicates a presence of one or more grammar errors in the reference response. The second numerical measure indicates a degree to which the reference response describes the subject matter of the given picture as determined based the reference corpus. The third numerical measure indicates a degree of awkward word usage in the reference response as determined based on the n-gram dataset. The training of the scoring model may further include conducting a numerical regression analysis based on the first, second, and third numerical measures and reference score for each of the plurality of reference responses to determine the first, second, and third weighting factors. In another example, the training of the scoring model may include conducting another suitable machine-learning analysis (e.g., a random forest learning analysis) based on the first, second, and third numerical measures and reference score for each of the plurality of reference responses to determine the first, second, and third weighting factors.

In the example of FIG. 3, the scoring model is trained using the plurality of reference responses based on a given picture, and the scoring model is intended to be used thereafter in scoring constructed responses that are based on the given picture. In this manner, the scoring model trained in the example of FIG. 3 may be picture-specific. In other examples, however, the scoring model may be trained using data that does not relate to a particular picture, and the model may thereafter be used to score responses based on various different pictures. Such a scoring model is not picture-specific.

In an example, the scoring model was trained using more than 1,860 constructed responses, where each of the constructed responses was written in response to one of 434 picture-based test items. In this example, each constructed response was scored by a single human grader. In other examples, the constructed responses may be scored by multiple human graders.

At 308, the model is configured with the determined values of the first, second, and third weighting factors. The scoring model is then ready to be used for scoring, i.e., to receive a first numerical measure, a second numerical measure, and a third numerical measure for the first variable, second variable, and third variable, respectively, of an actual constructed response from a user to be scored so as to generate a score for the actual constructed response. As noted previously, the score for the actual constructed response is indicative of the user's English language proficiency as presented in a constructed response generated by the user, the constructed response being based on the given picture. In this manner, the model is thereafter configured to perform automated scoring on new constructed responses that need to be scored.

Figure 5:
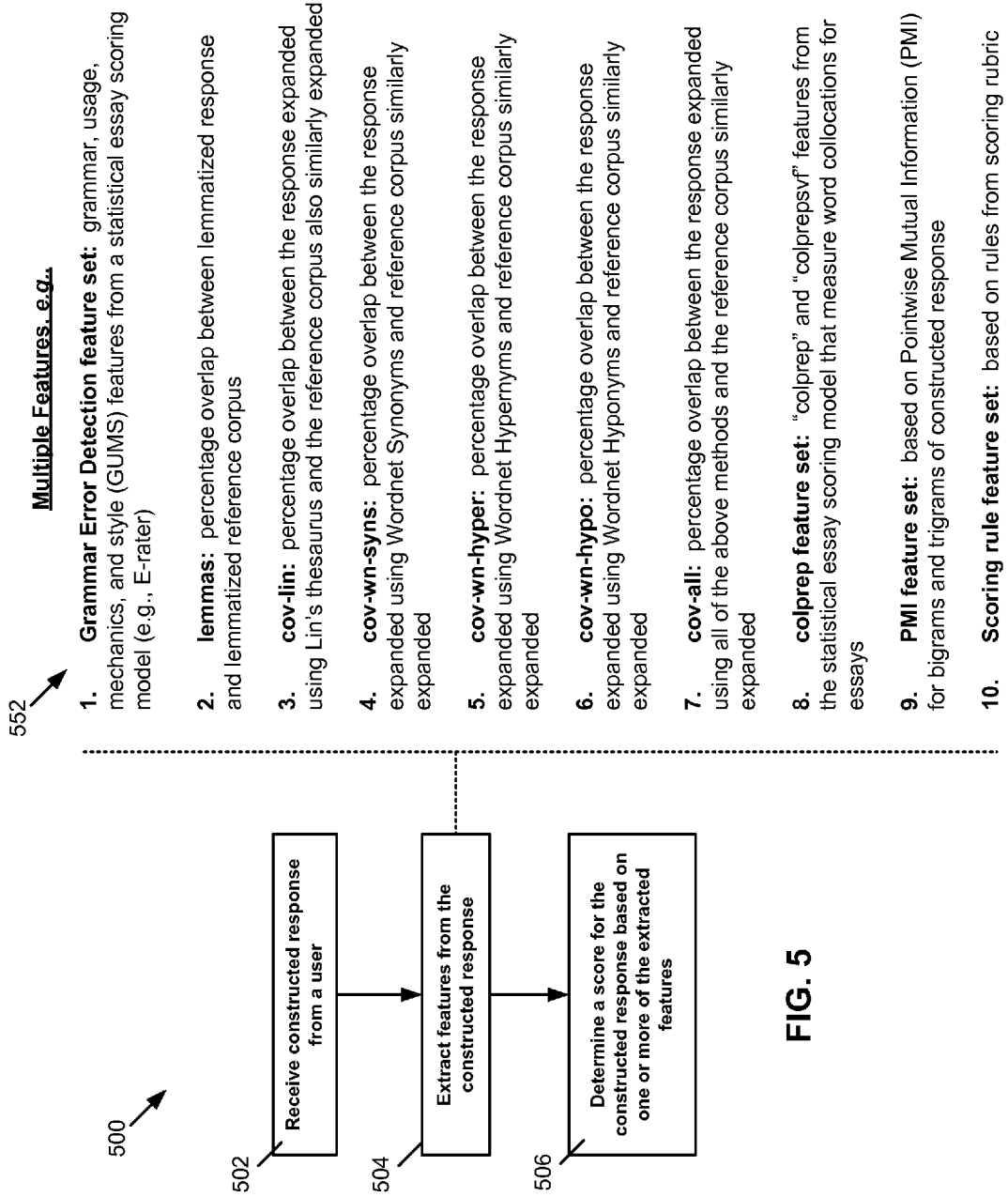
FIG. 5 depicts a flowchart including example steps for measuring a user's English language proficiency and example features that are extracted from a textual response to a picturebased item generated by the user.

FIG. 5 depicts a flowchart 500 including example steps for measuring a user's English language proficiency and example features 552 that are extracted from a textual response to a picture-based item generated by the user. At 502, the constructed response is received from the user, where the constructed response is based on a picture. In an example, the constructed response is provided by the user in response to a picture-based test item (e.g., the picture-based test item 200 of FIG. 2). At 504, one or more features are extracted from the constructed response. The extracted features may be numerical measures that are determined by processing the constructed response, a reference corpus, and/or an n-gram dataset with a processing system, as described above with reference to FIG. 1.

The one or more features extracted may include features from the example features 552 of FIG. 5. A "Grammar Error Detection" feature set includes features that indicate a presence of one or more grammar errors in the constructed response. In an example, one or more of the Grammar Error Detection features are features utilized in the E-rater essay scoring system, which is the property of Educational Testing Service. The E-rater essay scoring system, described in U.S. Pat. Nos. 6,181,909 and 6,366,759 to Burstein et al., which are incorporated herein by reference in their entireties, includes a number of grammar, usage, mechanics, and style (i.e., "GUMS") features that detect and quantify different types of English usage errors in constructed responses. One or more of these GUMS features may be described in "Automated Essay Scoring With E-rater® V.2.0," by Y. Attali et al., ETS Research Report Series 2004.2 (2004), which is incorporated herein by reference in its entirety. In an example, 203 GUMS features from the E-rater essay scoring system are included in the Grammar Error Detection feature set used in the approaches described herein. In other examples, a different number of the GUMS features are utilized.

Some examples of the GUMS features of the E-rater essay scoring system that may be included in the Grammar Error Detection feature set are "GUMS 102" (Number of Run-on Sentences), "GUMS104" (Number of Subject Verb Agreement Errors), "GUMS106" (Number of Pronoun Errors), "GUMS107" (Number of Missing Possessive Errors), "GUMS201" (Number of Wrong Article Errors), "GUMS206" (Number of Preposition Errors), "GUMS301" (Number of Spelling Errors), "GUMS403" (Too Many Sentences Beginning With Coordinating Conjunction), "GUMS404" (Too Many Short Sentences), "GUMS405" (Too Many Long Sentences), and "GUMS406" (Number of Passive Sentences). Other GUMS features that may be used are intended to detect, for example, missing article errors, non-standard verb or word form errors, double negative errors, fragment or missing comma errors, ill-formed verb errors, wrong form of word errors, wrong part of speech errors, and missing punctuation errors. In an example, a subset of the GUMS features utilized in the E-rater essay scoring system are selected and included in the Grammar Error Detection feature set utilized in the approaches described herein.

As explained above with reference to FIG. 1, a constructed response generated by a user may be parsed to generate a set of individual words associated with the constructed response. This set of individual words and a reference corpus may be processed with a processing system to determine features that indicate the degree to which the constructed response describes the subject matter of the picture. The second, third, fourth, fifth, sixth, and seventh features of the features 552 of FIG. 5 (i.e., the "lemmas," "cov-lin," "cov-wn-syns," "cov-wn-hyper," "cov-wn-hypo," and "cov-all" features) are examples of these features. Each of these features is determined based on a reference corpus that has been designated as representative of a subject matter of a picture.

In an example, the reference corpus is a text corpus describing the picture that is manually constructed by one or more human beings. In other examples, the reference corpus is generated using an automated, computer-based method that requires no human intervention or minimal human intervention (e.g., a method that uses computer-based image recognition and thereafter generates the words of the reference corpus in an automated manner). The description of the picture provided in the reference corpus is intended to be a comprehensive textual representation of the picture, in an embodiment. In the example described above with reference to FIG. 3, where a scoring model is trained using constructed responses that are each written in response to one of 434 picture-based test items, a reference corpus is manually constructed for each of the pictures of the 434 items.

FIG. 6 illustrates an example protocol for generating a reference corpus. The example protocol includes instructions 650 that ask a human annotator to first exhaustively list all of the items (animate and inanimate) in the picture (e.g., "List one by one, all the items and events you see in the picture. These may be animate objects (e.g., man), inanimate objects (e.g., table) or events (e.g., dinner). Try to capture both the overall setting (restaurant), as well as the objects that make up the picture (e.g., man, table, food). These are generally (but not necessarily) nouns and noun phrases. Some pictures can have many items, while some have only a few. The goal is to list 10-15 items and to capture as many items as possible, starting with the most obvious ones. If the picture is too sparse, and you are not able to list at least 10 items, please indicate this as a comment. On the other hand, if you feel that more than 15 items need to be listed, you can do so by extending the list in the annotation text file," as illustrated in the instructions 650 of FIG. 6).

The instructions 650 of the example protocol further ask the human annotator to describe the scene in the picture (e.g., "Describe the scene unfolding in the picture. The scene in the picture may be greater than the sum of its parts (many of which you will list in part-1). For example, the objects in a picture could be 'shoe' man"chair,' but the scene in the picture could be that of a shoe purchase. The description tries to recreate the scene (or parts of the scene) depicted in the picture. Generate a paragraph of 5-7 sentences describing the picture. Some of these sentences will address what is going on, while some may address relations between items. The proportions of these will differ, based on the picture. Make sure that you generate at least one sentence containing the two seed words. If the picture is too simple, and you are not able to generate at least 5 sentences, please indicate this as a comment. On the other hand, if you feel that more than 7 sentences are needed to adequately capture a very densely populated picture, you can do so by extending the list in the annotation text file, as illustrated in the instructions 650 of FIG. 6). Example descriptions of a scene in a picture may include, for example, "The man is bagging the groceries," and "The grocer is standing behind the counter," among others.

In an example, the size of the reference corpus for each picture-based test item is larger than the constructed response that is requested by the item. For instance, in examples where the picture-based test item requests that the user write a single sentence based on a picture (e.g., as illustrated in the example picture-based test item 200 of FIG. 2), the reference corpus may be much larger than the requested single sentence. In an example where human annotators are used to manually create reference corpuses, a single human annotator may be used for each picture-based test item. In this example, double annotation using a secondary annotator may be used in cases where coverage of a corpus created by a primary annotator is determined to be insufficient. When double annotation is used, the reference corpuses created by the primary and secondary annotators may be combined to form a single reference corpus.

With reference again to FIG. 5, the lemmas, cov-lin, cov-wn-syns, cov-wn-hyper, cov-wn-hypo, and cov-all features are determined based on the above-described reference corpuses and indicate the degree to which a constructed response describes the subject matter of the picture. Specifically, each of these features provides a measure of a content overlap between a constructed response and a corresponding reference corpus. To determine the lemmas feature, the constructed response is parsed at a word level to identify in the constructed response a set of individual words that make up the constructed response. Stop words (e.g., "the," "is," "at," "which," "on," etc.) are removed from the set of individual words, thus generating a smaller set of individual words associated with the constructed response. The smaller set of words comprises a lemmatized version of the constructed response. Similarly, stop words are removed from the corresponding reference corpus to generate a lemmatized version of the reference corpus. Each word of the smaller set of words (i.e., each word of the lemmatized version of the constructed response) is compared to individual words of the lemmatized version of the reference corpus to determine whether the word of the smaller set of words is included in the lemmatized version of the reference corpus. After making this determination for each word of the smaller set of words, a percentage overlap for the constructed response is calculated according to:

$$\frac{|\text{number of words of lemmatized response included in lemmatized reference corpus}|}{|\text{total number of words in lemmatized response}|}.$$

The percentage overlap, as determined based on the equation above, is the lemmas feature included in the features 552 of FIG. 5.

Because it may not be necessary for a test-taker to use the exact same words included in a corresponding reference corpus (e.g., a reference corpus may refer to a person in a picture as "lady," while a constructed response may correctly refer to the same person as "woman," "girl," or "person"), both the constructed response and the corresponding reference corpus may be expanded, and additional content-relevance features may be extracted based on these expansions. In an example, the cov-lin feature of the features 552 of FIG. 5 is determined by (i) expanding the smaller set of words comprising the lemmatized version of the constructed response using a thesaurus (e.g., Lin's Thesaurus, known to those of ordinary skill in the art), (ii) expanding the lemmatized version of the reference corpus using the same thesaurus, and (iii) determining a percentage overlap between the expanded versions based on:

$$\frac{|\text{number of words of expanded lemmatized response included in expanded lemmatized reference corpus}|}{|\text{total number of words in expanded lemmatized response}|}.$$

The percentage overlap, as determined based on the equation above, is the cov-lin feature included in the features 552 of FIG. 5.

The cov-wn-syns, cov-wn-hyper, and cov-wn-hypo features of the features 552 of FIG. 5 are determined in similar manners. Specifically, the cov-wn-syns feature represents the percentage overlap between the lemmatized version of the constructed response expanded using WordNet Synonyms and the lemmatized version of the reference corpus also expanded using WordNet Synonyms. The cov-wn-hyper feature represents the percentage overlap between the lemmatized version of the constructed response expanded using WordNet Hypernyms and the lemmatized version of the reference corpus also expanded using WordNet Hypernyms. The cov-wn-hypo feature represents the percentage overlap between the lemmatized version of the constructed response expanded using WordNet Hyponyms and the lemmatized version of the reference corpus also expanded using WordNet Hyponyms.

The cov-all feature of the features 552 of FIG. 5 is determined by (i) expanding the smaller set of words comprising the lemmatized version of the constructed response using Lin's Thesaurus, WordNet Synonyms, WordNet Hypernyms, and WordNet Hyponyms, (ii) expanding the lemmatized version of the reference corpus using Lin's Thesaurus, WordNet Synonyms, WordNet Hypernyms, and WordNet Hyponyms, and (iii) determining a percentage overlap between the expanded versions.

The lemmas, cov-lin, cov-wn-syns, cov-wn-hyper, cov-wn-hypo, and cov-all features are part of a "relevance feature set" that is extracted from the constructed response. The relevance feature set may also include a "prompt ID" feature. The prompt ID feature may be any type of identifier (e.g., a number, etc.) that uniquely identifies the picture-based test item to which a constructed response responds. The prompt ID feature is included in the relevance feature set because an amount of overlap between a constructed response and a corresponding reference corpus may depend on the prompt. For example, some prompt pictures may be very sparse (e.g., including only a small number of objects), and for such pictures, a high amount of overlap between the constructed response and the reference corpus may be expected. By contrast, some prompt pictures may be very dense (e.g., including a large number of objects and items), and consequently, even a small overlap between the constructed response and the reference corpus may be sufficient to cause the features related to content relevance to have relatively high values.

The "colprep feature set" includes features that indicate a degree of awkward word usage in the constructed response. In an example, the colprep feature set utilizes features from the E-rater essay scoring system. Specifically, the E-rater essay scoring system includes features related to word collocations, where such features measure a degree of association between adjacent words over an entire constructed response. The "colprep" feature is an example word collocation feature included in the E-rater system that may be used in the approaches described herein. The colprep feature measures correct preposition usage and the quality of collocations (i.e., degrees of association between adjacent words) included in a constructed response, and in an example, the colprep feature is a sum of "Mean Probability of Prepositions" and "Good Collocation Density" features used in the E-rater system. The "colprepsvf" feature is another word collocation feature of the E-rater essay scoring system that may be used in the approaches described herein. The colprepsvf feature is a composite feature and has a value that reflects preposition usage, quality of collocations, and sentence variety in a constructed response. In an example, the colprepsvf feature is a sum of "Preposition Usage," "Good Collocation Density," and "Sentence Variety Feature" features used in the E-rater system. The colprep and colprepsvf features are known to those of ordinary skill in the art.

As explained above with reference to FIG. 1, a constructed response generated by a user may be processed to identify in the constructed response a plurality of multi-word sequences. The plurality of multi-word sequences and an n-gram dataset (e.g., the Trendstream database, the Google 1T web corpus, etc.) may be processed with a processing system to determine additional features that indicate a degree of awkward word usage in the constructed response. The "PMI feature set" of the features 552 of FIG. 5 includes such features for determining awkward word usage in the constructed response.

In an example, to extract the features of the PMI feature set from a constructed response, the constructed response is processed to identify all adjacent word pairs (i.e., bigrams) and adjacent word triples (i.e., trigrams) included in the constructed response. The extraction of the features of the PMI feature set further includes determining a Pointwise Mutual Information (PMI) value for each of the adjacent word pairs. The determining of the PMI value for an adjacent word pair may include determining a probability p(AB) of the adjacent word pair appearing in a well-formed text based on the n-gram dataset. In an example, determining the probability p(AB) of the adjacent word pair may include searching the adjacent word pair across entries of the n-gram dataset, where each entry of the n-gram dataset includes an English word n-gram and an associated frequency count, probability value, or other measure (e.g., a statistical association score). When the adjacent word pair is searched across the entries of the n-gram dataset and a match is found, the frequency count, probability value, or other measure of the entry may provide an indication of the probability p(AB).

The determining of the PMI value for the adjacent word pair may also include determining probabilities p(A) and p(B) of first and second words, respectively, of the adjacent word pair appearing in a well-formed text. The probabilities p(A) and p(B) may be determined based on the n-gram dataset. Specifically, in an example, determining the probability p(A) for the first word of the adjacent word pair may include searching the first word across entries of the n-gram dataset. When a match is found for the first word in the entries of the n-gram dataset, the frequency count, probability value, or other measure of the entry may provide an indication of the probability p(A). The probability p(B) for the second word may be determined in a like manner.

After determining the probabilities p(AB), p(A), and p(B), the PMI value for the adjacent word pair is determined based on $$\log_2 \frac{p(AB)}{p(A) \cdot p(B)}.$$

In other examples, the PMI value for the adjacent word pair is determined directly from the n-gram dataset or another database or file (e.g., the Trendstream database). In this example, each entry of the n-gram dataset, database, or file includes an adjacent word pair and its associated PMI value. In these examples, the adjacent word pair may be searched across the n-gram dataset, database, or file, with a matching entry of the n-gram dataset, database, or file indicating the PMI value of the adjacent word pair.

As noted above, PMI values are determined for each adjacent word pair of the constructed response. For a given adjacent word pair, a relatively high PMI value indicates a relatively high probability of the adjacent word pair appearing in well-formed texts. Conversely, negative PMI values indicate that the adjacent word pair is less likely than chance to occur together.

The extraction of the features of the PMI feature set further includes determining a PMI value for each of the adjacent word triples of the constructed response. The determining of the PMI value for an adjacent word triple may include determining a probability p(A'B'C') of the adjacent word triple appearing in a well-formed text based on the n-gram dataset. In an example, determining the probability p(A'B'C') of the adjacent word triple includes searching the adjacent word triple across entries of the n-gram dataset, where each entry of the n-gram dataset includes an English word n-gram and an associated frequency count, probability value, or other measure (e.g., a statistical association score). When the adjacent word triple is searched across the entries of the n-gram dataset and a match is found, the frequency count, probability value, or other measure of the entry may provide an indication of the probability p(A'B'C').

The determining of the PMI value for the adjacent word triple may also include determining probabilities p(A'), p(B'), and p(C') of first, second, and third words, respectively, of the adjacent word triple appearing in a well-formed text. The probabilities p(A'), p(B'), and p(C') may be determined based on the n-gram dataset. Specifically, in an example, determining the probability p(A') for the first word of the adjacent word triple may include searching the first word across entries of the n-gram dataset. When a match is found for the first word in the entries of the n-gram dataset, the frequency count, probability value, or other measure of the entry may provide an indication of the probability p(A'). The probabilities p(B') and p(C') for the second and third words may be determined in a like manner.

After determining the probabilities p(A'B'C'), p(A'), p(B), and p(C'), the PMI value for the adjacent word triple is determined based on $$\log_2 \frac{p(A'B'C')}{p(A') \cdot p(B') \cdot p(C')}.$$

As noted above, PMI values are determined for each adjacent word triple of the constructed response. In other examples, the PMI value for the adjacent word triple is determined directly from the n-gram dataset or another database or file (e.g., the Trendstream database). In this example, each entry of the n-gram dataset, database, or file includes an adjacent word triple and its associated PMI value. In these examples, the adjacent word triple may be searched across the n-gram dataset, database, or file, with a matching entry of the n-gram dataset, database, or file indicating the PMI value of the adjacent word triple.

The extraction of the features of the PMI feature set may further include processing the PMI values for the adjacent word pairs and the adjacent word triples. In an example, the processing of the PMI values for the adjacent word pairs and the adjacent word triples includes assigning each of the PMI values to one of a plurality of bins, where each of the bins is associated with a range of PMI values. Specifically, in an example, the PMI values for the adjacent word pairs and the adjacent word triples of the constructed response are assigned to bins, with eight (8) bins for adjacent word pairs and eight (8) bins for adjacent word triples. In an example, each bin represents a range for PMI p as follows:

$$bin_1 = \{p \in \mathbb{R} \mid p > 20\}$$

$$bin_2 = \{p \in \mathbb{R} \mid 10 < p \leq 20\}$$

$$bin_3 = \{p \in \mathbb{R} \mid 1 < p \leq 10\}$$

$$bin_4 = \{p \in \mathbb{R} \mid 0 < p \leq 1\}$$

$$bin_5 = \{p \in \mathbb{R} \mid -1 < p \leq 0\}$$

$$bin_6 = \{p \in \mathbb{R} \mid -10 < p \leq -1\}$$

$$bin_7 = \{p \in \mathbb{R} \mid -20 < p \leq -10\}$$

$$bin_8 = \{p \in \mathbb{R} \mid p \leq -20\}$$

With the PMI values for the adjacent word pairs and the adjacent word triples assigned to the sixteen (16) bins, the features of the PMI feature set can be extracted. In an example, the PMI feature set includes a total of forty (40) features. Eight of the forty features are based on the counts of adjacent word pairs falling into each bin (e.g., "Number of adjacent word pairs falling into $bin_1$," "Number of adjacent word pairs falling into $bin_2$," and so on). Eight of the forty features are based on percentages of the total number of adjacent word pairs falling into each bin (e.g., "Percentage of total number of adjacent word pairs falling into $bin_1$," "Percentage of total number of adjacent word pairs falling into $bin_2$," and so on). Eight of the forty features are based on the counts of adjacent word triples falling into each bin (e.g., "Number of adjacent word triples falling into $bin_1$," "Number of adjacent word triples falling into $bin_2$," and so on). Eight of the forty features are based on percentages of the total number of adjacent word triples falling into each bin (e.g., "Percentage of total number of adjacent word triples falling into $bin_1$," "Percentage of total number of adjacent word triples falling into $bin_2$," and so on).

The PMI feature set also includes as features the maximum, minimum, and median PMI values obtained over all adjacent word pairs of the constructed response. Similarly, the PMI feature set also includes as features the maximum, minimum, and median PMI values obtained over all adjacent word triples of the constructed response. The maximum and minimum PMI values capture the best and worst word collocations in the constructed response. The median PMI values capture the overall collocation quality of the constructed response (e.g., if the median PMI values for the adjacent word pairs and adjacent word triples are low numbers, then the constructed response may have many poor phrasal collocations).

The PMI feature set also includes (i) a first null-PMI feature that is used to count the number of adjacent word pairs that had zero entries in the n-gram dataset, and (ii) a second null-PMI feature that is used to count the number of adjacent word triples that had zero entries in the n-gram dataset. The null-PMI features are indicators that the given word collocations were not found even once in the n-gram dataset. In an example, a relatively large n-gram dataset is used, such that collocations are generally only not found in the n-gram dataset when words of the collocations are misspelled or when the words never occur together.

The "scoring rule feature set" of the features 552 of FIG. 5 are based on rules for a scoring rubric associated with the picture-based test item. In an example where the picture-based test item is graded based on the scoring rubric 400 of FIG. 4, four rules from the scoring rubric 400 are encoded as features in the scoring rule feature set. These features may be binary-valued. Specifically, a first feature of the scoring rule feature set indicates whether a first keyword of the keywords 208 is present in the constructed response. A second feature of the scoring rule feature set indicates whether a second keyword of the keywords 208 is present in the constructed response. A third feature of the scoring rule feature set indicates whether both keywords of the keywords 208 are present in the constructed response. A fourth feature of the scoring rule feature set indicates whether there is more than one sentence in the constructed response. It is noted that the four features of the scoring rule feature set described above are exemplary only, and that other features may be encoded based on a scoring rubric in other examples.

In total, the features 552 of FIG. 5 may include 256 features. As noted above, the Grammar Error Detection feature set may include, in an example, 203 GUMS features from the E-rater essay scoring system. The lemmas, cov-lin, cov-wn-syns, cov-wn-hyper, cov-wn-hypo, cov-all, and prompt ID features comprise seven (7) features that are indicative of a degree to which the constructed response describes a subject matter of a given picture. The colprep and colprepsvf features comprise two (2) features that indicate a degree of awkward word usage in the constructed response, and the forty (40) features of the PMI feature set indicate the same. The features 552 of FIG. 5 may further include the four (4) features of the scoring rule feature set described above. Additional features not included in the features 552 of FIG. 5 may be used in other examples. In other examples, a smaller number of features are used.

At 506, a score for the constructed response is determined using the scoring model based on the one or more features that are extracted from the constructed response. In an example, the score measures the user's English language proficiency, vocabulary knowledge, or another construct, as presented in the constructed response.

Figure 7:
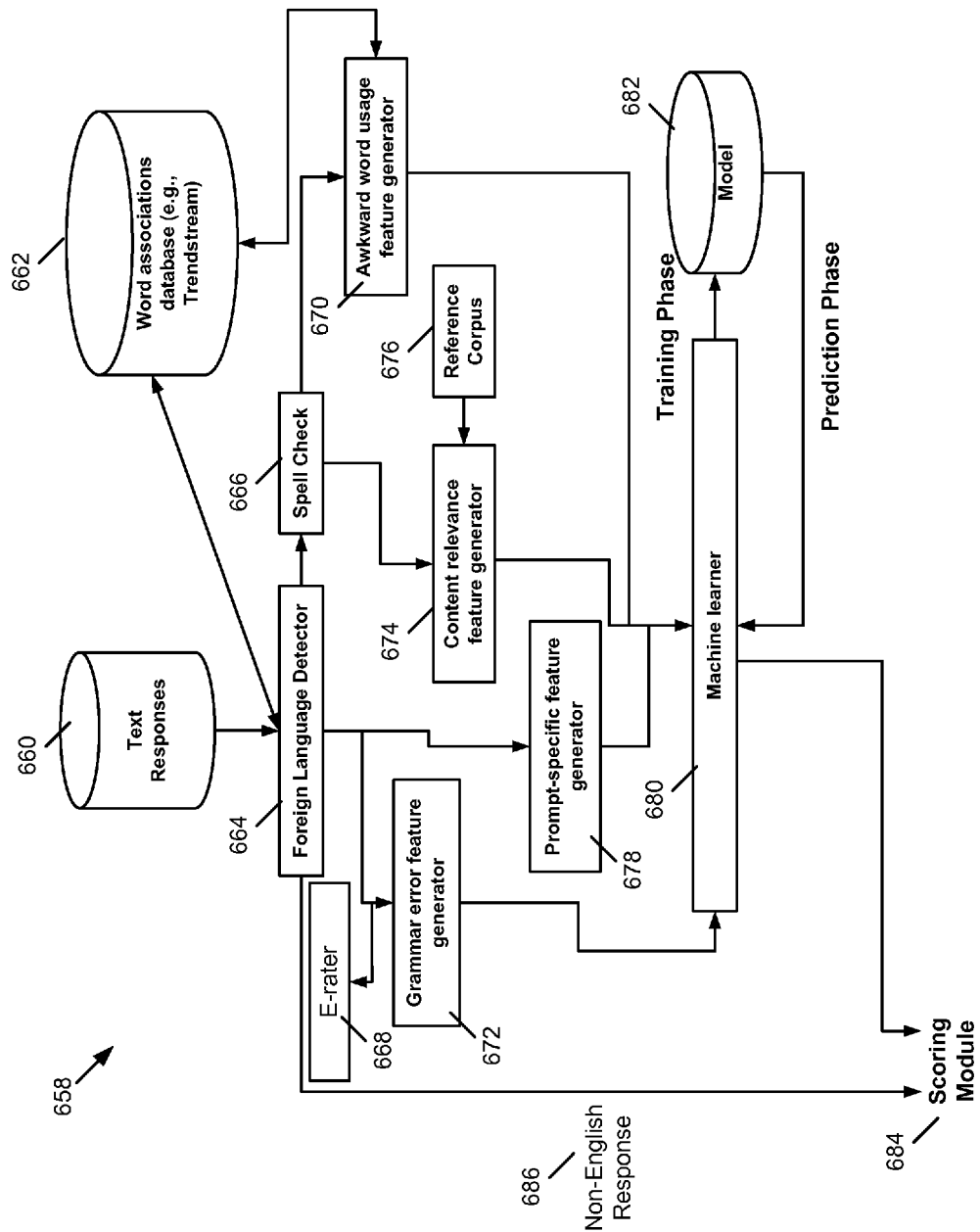
FIG. 7 is a block diagram illustrating an example computer-based system configured to implement the approaches described herein.

FIG. 7 is a block diagram 658 illustrating an example computer-based system configured to implement the approaches described herein. In an example, the computer-based system is implemented as a software system in Java. In a training phase, a model 682 is built based on (i) features extracted from constructed responses 660 that have been scored by one or more humans, and (ii) the scores assigned to the constructed responses. In a prediction phase (i.e., a scoring phase), the model 682 is used in predicting scores for the constructed responses 660 in a manner that requires no human intervention or only minimal human intervention.

In either phase, a constructed response of the constructed responses 660 is received at a foreign language detector 664. The foreign language detector 664 is a rule-based scorer that is configured to determine if the constructed response is in a language other than English. To make this determination, the constructed response is processed to identify all adjacent word pairs (i.e., bigrams) in the constructed response, and a PMI value is determined for each of the adjacent word pairs. As illustrated in FIG. 7, the foreign language detector 664 may determine the PMI values for the adjacent word pairs of the response using a word associations database 662 (e.g., the Trendstream database), where the word associations database 662 comprises an n-gram dataset. The use of a word associations database comprising an n-gram dataset for determining PMI values of adjacent word pairs is described above with reference to FIG. 5. An average PMI value for the constructed response is determined based on the PMI values for all of the adjacent word pairs of the constructed response. To determine if the constructed response is in a language other than English, the average PMI value is compared to a threshold PMI value. If the constructed response has an average PMI value that meets or exceeds the threshold PMI value, the constructed response is designated as likely being in the English language by the foreign language detector 664. Conversely, if the constructed response has an average PMI value that is below the threshold PMI value, the constructed response is designated as not likely being in the English language by the foreign language detector 664. In an example, the threshold is determined by manually inspecting PMI values for sentences belonging to English and non-English news texts.

If the constructed response is designated as not likely being in the English language, the response is not passed to other modules of the computer-based system, and instead, the response is assigned a score of zero ("0") without further evaluation. This is illustrated in FIG. 7, which shows the foreign language detector 684 providing a non-English response 686 to a scoring module 684 to be assigned a score of zero without passing the response 686 through other modules of the system. During the training phase, responses assigned a score of zero in this manner are effectively filtered out, such that they are not used in the building of the model 682. During the prediction phase, the score of zero assigned to a response in this manner comprises a final score for the response. The foreign language detector 664 is also configured to assign scores of zero to responses that are blank.

If the response is designated as likely being in the English language, the foreign language detector 664 passes the response to different modules of the system, thus allowing the response (i) to be used in building the model 682 (i.e., during the training phase), or (ii) to be scored (i.e., during the prediction phase). As illustrated in FIG. 7, the foreign language detector 664 passes the response to a grammar error feature generator 672. In an example, the grammar error feature generator 672 is configured to extract from the constructed response one or more of the GUMS features from the E-rater essay scoring system 668. As discussed above, these features indicate a presence of one or more grammar errors in the constructed response. The grammar error feature generator 672 provides the extracted features to a machine learner 680. In the training phase, the machine learner 680 uses these features and others in building the model 682. In the prediction phase, the machine learner 680 utilizes a scoring model to generate a score for the constructed response based on these features and others.

If designated as likely being in the English language, the response is also passed to a prompt-specific feature generator 678. In an example, the prompt-specific feature generator 678 is configured to extract from the constructed response one or more features of the "scoring rule feature set" discussed above. These features incorporate specific requirements of the prompt to which the constructed was provided. The prompt-specific feature generator 678 provides the extracted features to the machine learner 680.

If designated as likely being in the English language, the response is also passed to a spell check module 666. The spell check module 666 corrects spelling errors in the constructed response 102 using conventional automated, computer-based algorithms known to those of ordinary skill in the art. The output of the spell check module 666 is a transformed, corrected version of the constructed response. The spell check module 666 passes the transformed response to a content relevance feature generator 674. In an example, the content relevance feature generator 674 is configured to extract from the constructed response the lemmas, cov-lin, cov-wn-syns, cov-wn-hyper, cov-wn-hypo, cov-all, and prompt ID features described above. These features are intended to be indicative of a degree to which the constructed response describes a subject matter of a given picture. In extracting these features, a reference corpus 676 may be used. The use of a reference corpus in extracting the lemmas, cov-lin, cov-wn-syns, cov-wn-hyper, cov-wn-hypo, and cov-all features is described above with reference to FIG. 5. The content relevance feature generator 674 provides the extracted features to the machine learner 680.

The spell check module 666 also passes the transformed response (i.e., the response with spelling errors corrected) to an awkward word usage feature generator 670. In an example, the awkward word usage feature generator 670 is configured to extract from the constructed response (i) the colprep feature, (ii) the colprepsvf feature, and (iii) the features of the "PMI feature set," all of which are described above. These features are intended to be indicative of a degree of awkward word usage in the constructed response. In extracting these features, the word associations database 662 (e.g., the Trendstream database) may be used. The use of a word associations database (e.g., including an n-gram dataset) in extracting the features of the PMI feature set is described above with reference to FIG. 5. The awkward word usage feature generator 670 provides the extracted features to the machine learner 680.

Figure 8:
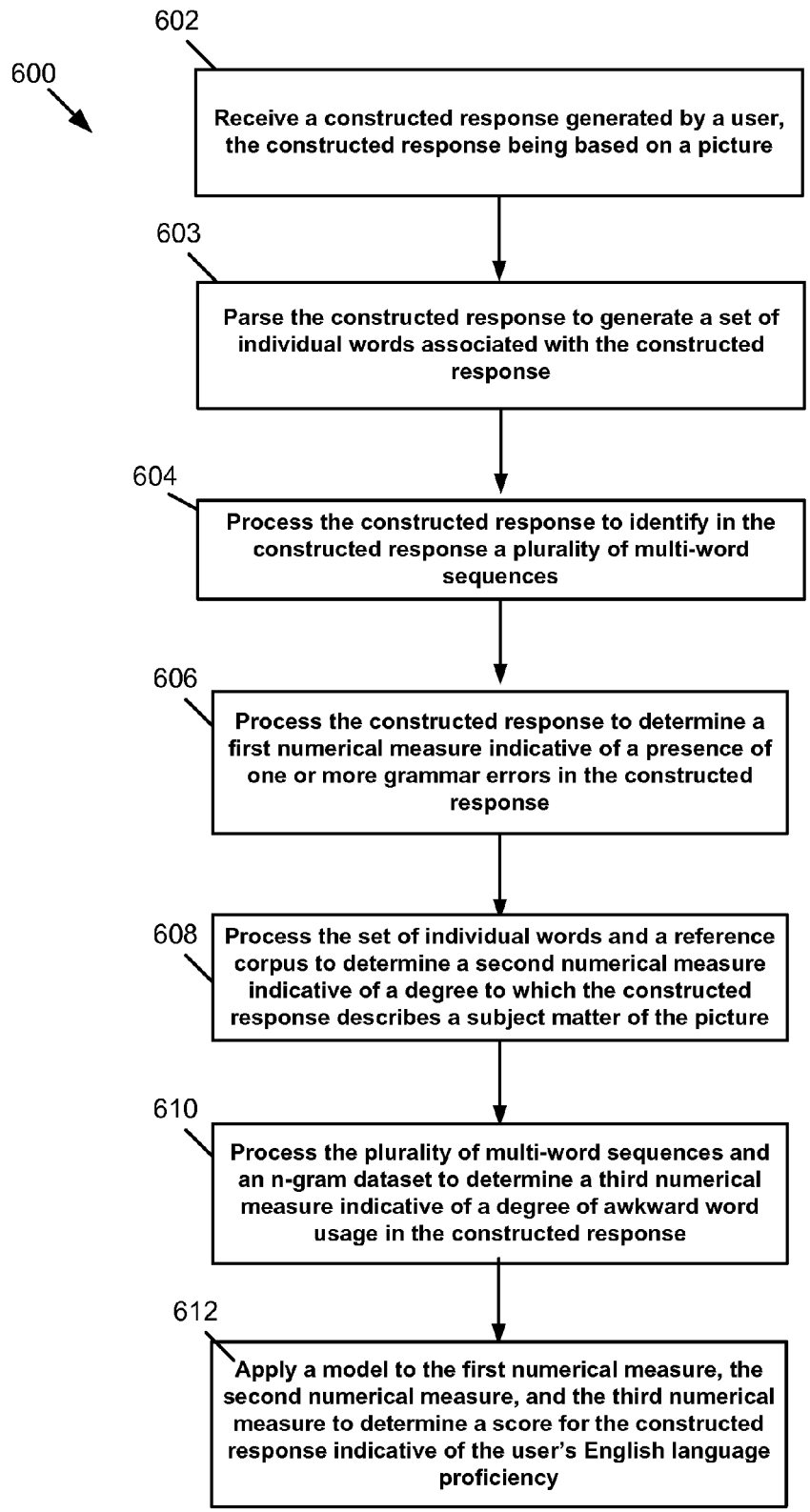
FIG. 8 is a flowchart depicting operations of an example computer-implemented method of measuring a user's English language proficiency.

FIG. 8 is a flowchart 600 depicting operations of an example computer-implemented method of measuring a user's English language proficiency. At 602, a constructed response generated by a user is received, the constructed response being based on a picture. At 603, the constructed response is parsed with a processing system to generate a set of individual words associated with the constructed response. At 604, the constructed response is processed with the processing system to identify in the constructed response a plurality of multi-word sequences.

At 606, the constructed response is processed with the processing system to determine a first numerical measure indicative of a presence of one or more grammar errors in the constructed response. At 608, the set of individual words and a reference corpus are processed with the processing system to determine a second numerical measure indicative of a degree to which the constructed response describes a subject matter of the picture. Each word of the set of individual words is compared to individual words of the reference corpus to determine the second numerical measure, the reference corpus having been designated as representative of the subject matter. At 610, the plurality of multi-word sequences and an n-gram dataset are processed with the processing system to determine a third numerical measure indicative of a degree of awkward word usage in the constructed response. Each of the multi-word sequences is searched across entries of the n-gram dataset to determine the third numerical measure, where each entry of the n-gram dataset includes an English word n-gram and an associated statistical association score.

At 612, a model is applied to the first numerical measure, the second numerical measure, and the third numerical measure to determine a score for the constructed response indicative of the user's English language proficiency. The model includes a first variable and an associated first weighting factor, the first variable receiving a value of the first numerical measure. The model also includes a second variable and an associated second weighting factor, the second variable receiving a value of the second numerical measure. The model further includes a third variable and an associated third weighting factor, the third variable receiving a value of the third numerical measure.

Figure 9A:
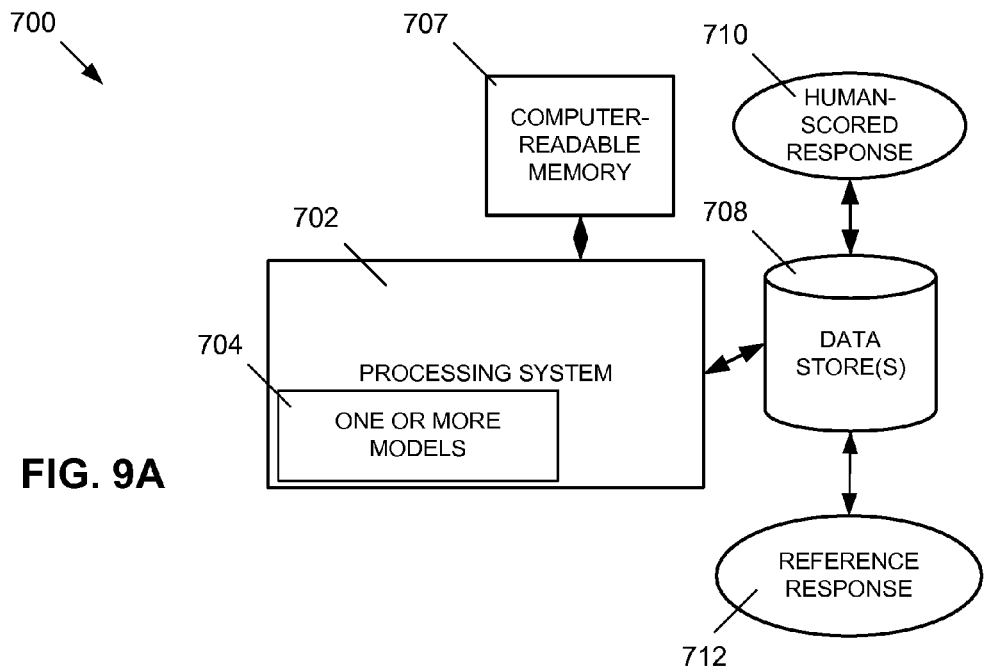
FIGS. 9A, 9B, and 9C depict example systems for measuring a user's English language proficiency.
Figure 9B:
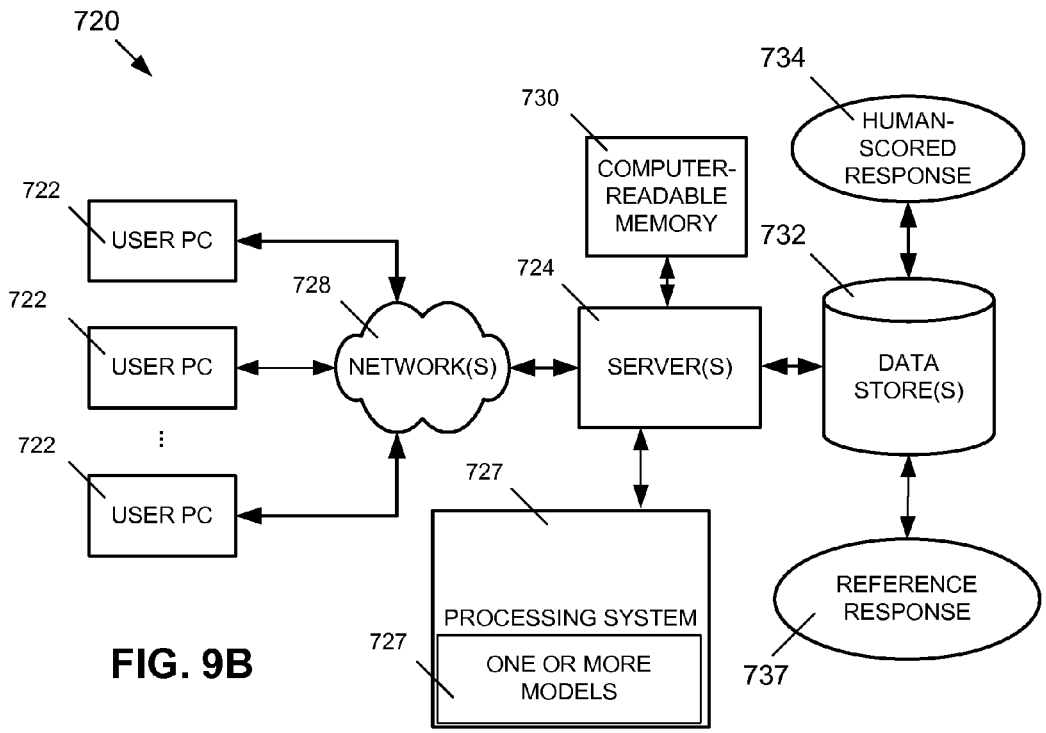
Figure 9C:
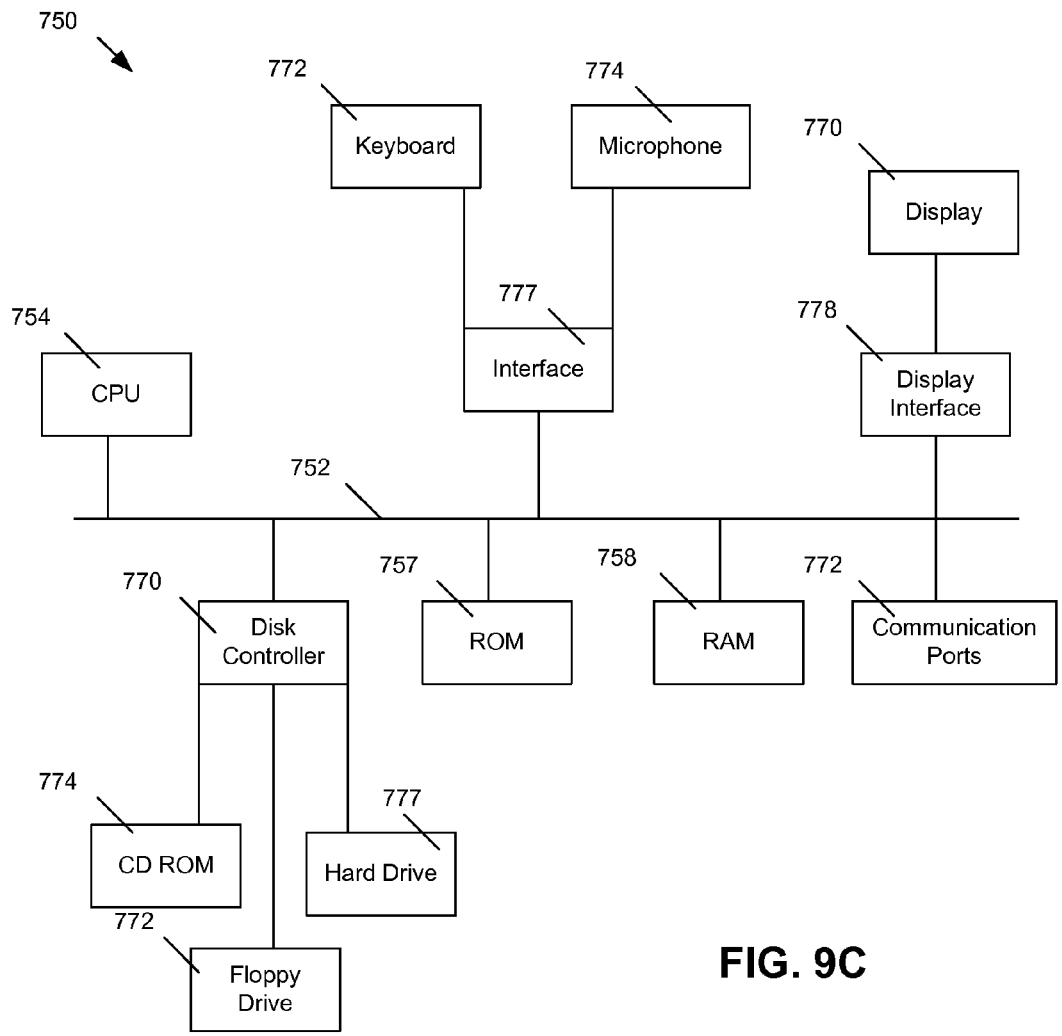

FIGS. 9A, 9B, and 9C depict example systems for measuring a user's English language proficiency. For example, FIG. 9A depicts an exemplary system 700 that includes a standalone computer architecture where a processing system 702 (e.g., one or more computer processors located in a given computer or in multiple computers that may be separate and distinct from one another) includes one or more models 704 being executed on the processing system 702. The processing system 702 has access to a computer-readable memory 706 in addition to one or more data stores 708. The one or more data stores 708 may include human-scored responses 710 as well as reference responses 712. The processing system 702 may be a distributed parallel computing environment, which may be used to handle very large-scale data sets.

FIG. 9B depicts a system 720 that includes a client-server architecture. One or more user PCs 722 access one or more servers 724 running one or more models 726 on a processing system 727 via one or more networks 728. The one or more servers 724 may access a computer-readable memory 730 as well as one or more data stores 732. The one or more data stores 732 may contain human-scored responses 734 as well as reference responses 736.

FIG. 9C shows a block diagram of exemplary hardware for a standalone computer architecture 750, such as the architecture depicted in FIG. 9A that may be used to contain and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 756 and random access memory (RAM) 758, may be in communication with the processing system 754 and may contain one or more programming instructions for performing the method for measuring a user's English language proficiency. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 706, 730, 756, 758 or data stores 708, 732, 762, 764, 766 may include one or more data structures for storing and associating various data used in the example systems for measuring a user's English language proficiency. For example, a data structure stored in any of the aforementioned locations may be used to associate numerical measures of features and evidence of such numerical measures within a scored response. As another example, a data structure may be used to relate variables of a scoring model with associated weighting factors. Other aspects of the example systems for measuring a user's English language proficiency may be stored and associated in the one or more data structures (e.g., numerical measures, scores for human-scored reference responses, etc.).

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. The processor 754 may access one or more components as required.

A display interface 768 may permit information from the bus 752 to be displayed on a display 770 in audio, graphic, or alphanumeric format. Communication with external devices may optionally occur using various communication ports 772.

In addition to these computer-type components, the hardware may also include data input devices, such as a keyboard 773, or other input device 774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of measuring a user's English language proficiency, the method comprising:
receiving a constructed response generated by a user, the constructed response being based on a picture;

parsing the constructed response with a processing system to generate a set of individual words associated with the constructed response;
processing the constructed response with the processing system to identify in the constructed response a plurality of multi-word sequences, each multi-word sequence comprising a sequence of two or more adjacent words in the constructed response;
processing the constructed response with the processing system to determine a first numerical measure indicative of a presence of one or more grammar errors in the constructed response;
processing the set of individual words and a reference corpus with the processing system to determine a second numerical measure indicative of a degree to which the constructed response describes a subject matter of the picture, each word of the set of individual words being compared to individual words of the reference corpus to determine the second numerical measure, the reference corpus having been designated as representative of the subject matter;
processing the plurality of multi-word sequences of the constructed response and an n-gram dataset comprising a plurality of entries with the processing system to determine a third numerical measure indicative of a degree of awkward word usage in the constructed response, each of the multi-word sequences of the constructed response being searched across the entries of the n-gram dataset to determine the third numerical measure, wherein each entry of the n-gram dataset includes an English word n-gram and an associated statistical association score, the searching of each multi-word sequence comprising comparing the multi-word sequence of the constructed response to English word n-grams of the n-gram dataset to determine a matching entry of the n-gram dataset, the statistical association score for the matching entry indicating a probability of the multi-word sequence appearing in a well-formed text; and
applying a numerical, computer-based scoring model to the first numerical measure, the second numerical measure, and the third numerical measure to automatically determine a score for the constructed response indicative of the user's English language proficiency, the numerical, computer-based scoring model including
a first variable and an associated first weighting factor, the first variable receiving a value of the first numerical measure,
a second variable and an associated second weighting factor, the second variable receiving a value of the second numerical measure, and
a third variable and an associated third weighting factor, the third variable receiving a value of the third numerical measure.

2. The computer-implemented method of claim 1, wherein the determining of the second numerical measure comprises:
processing the set of individual words and a lexical database to generate an expanded set of individual words, the expanded set comprising synonyms, hyponyms, or hypernyms of the individual words;
processing the reference corpus and the lexical database to generate an expanded reference corpus, the expanded reference corpus comprising synonyms, hyponyms, or hypernyms of individual words included in the reference corpus;
determining a first metric for the constructed response, the first metric indicating a percentage of words of the set of individual words that are included in the reference corpus; and
determining a second metric for the constructed response, the second metric indicating a percentage of words of the expanded set of individual words that are included in the expanded reference corpus.

3. The computer-implemented method of claim 1, wherein the plurality of multiword sequences include adjacent word pairs and adjacent word triples, and wherein the determining of the third numerical measure comprises:
determining a Pointwise Mutual Information (PMI) value for each adjacent word pair of the plurality of multi-word sequences, the determining of the PMI value for an adjacent word pair comprising:
determining a probability p(AB) of the adjacent word pair appearing in a well-formed text based on the n-gram dataset,
determining probabilities p(A) and p(B) of first and second words, respectively, of the adjacent word pair appearing in a well-formed text based on the n-gram dataset, and
determining the PMI value for the adjacent word pair based on $$\log_2 \frac{p(AB)}{p(A) \cdot p(B)};$$

determining a PMI value for each adjacent word triple of the plurality of multi-word sequences, the determining of the PMI value for an adjacent word triple comprising:
determining a probability p(A'B'C') of the adjacent word triple appearing in a wellformed text based on the n-gram dataset,
determining probabilities p(A'), p(B'), and p(C') of first, second, and third words, respectively, of the adjacent word triple appearing in a well-formed text based on the n-gram dataset, and
determining the PMI value for the adjacent word triple based on $$\log_2 \frac{p(A'B'C')}{p(A') \cdot p(B') \cdot p(C')};$$

and
processing the PMI values for the adjacent word pairs and the adjacent word triples with the processing system to determine the third numerical measure.

4. The computer-implemented method of claim 3, wherein the processing of the PMI values for the adjacent word pairs and the adjacent word triples to determine the third numerical measure comprises:
assigning each of the PMI values for the adjacent word pairs and the adjacent word triples to one of a plurality of bins, each of the bins being associated with a range of PMI values;
determining a first metric for the constructed response, the first metric indicating, for each of the bins, a number of PMI values for the adjacent word pairs assigned to the bin;

determining a second metric for the constructed response, the second metric indicating, for each of the bins, a percentage of the PMI values for the adjacent word pairs assigned to the bin;

determining a third metric for the constructed response, the third metric indicating, for each of the bins, a number of PMI values for the adjacent word triples assigned to the bin; and determining a fourth metric for the constructed response, the fourth metric indicating, for each of the bins, a percentage of the PMI values for the adjacent word triples assigned to the bin.

5. The computer-implemented method of claim 1, wherein the plurality of multi-word sequences include adjacent word pairs, the method further comprising:

determining a Pointwise Mutual Information (PMI) value for each adjacent word pair of the plurality of multi-word sequences, the determining of the PMI value for an adjacent word pair comprising:

determining a probability p(AB) of the adjacent word pair appearing in a well-formed text based on the n-gram dataset, determining probabilities p(A) and p(B) of first and second words, respectively, of the adjacent word pair appearing in a well-formed text based on the n-gram dataset, and determining the PMI value for the adjacent word pair based on $$\log_2 \frac{p(AB)}{p(A) \cdot p(B)};$$

determining an average PMI value for the constructed response based on the PMI values;

determining that the average PMI value meets or exceeds a threshold PMI value, wherein a constructed response with an average PMI value that meets or exceeds the threshold PMI value is designated as likely being in the English language, and wherein a constructed response with an average PMI value that is below the threshold PMI value is designated as not likely being in the English language; and in response to the determining that the average PMI value meets or exceeds the threshold PMI value, performing the steps to determine the first, second, and third numerical measures and the score for the constructed response.

6. A system for measuring a user's English language proficiency, the system comprising:

a processing system; and computer-readable memory in communication with the processing system encoded with instructions for commanding the processing system to execute steps comprising:

receiving a constructed response generated by a user, the constructed response being based on a picture;

parsing the constructed response to generate a set of individual words associated with the constructed response;

processing the constructed response to identify in the constructed response a plurality of multi-word sequences, each multi-word sequence comprising a sequence of two or more adjacent words in the constructed response;

processing the constructed response to determine a first numerical measure indicative of a presence of one or more grammar errors included in the constructed response;

processing the set of individual words and a reference corpus to determine a second numerical measure indicative of a degree to which the constructed response describes a subject matter of the picture, each word of the set of individual words being compared to individual words of the reference corpus to determine the second numerical measure, the reference corpus having been designated as representative of the subject matter;

processing the plurality of multi-word sequences of the constructed response and an n-gram dataset comprising a plurality of entries to determine a third numerical measure indicative of a degree of awkward word usage in the constructed response, each of the multi-word sequences of the constructed response being searched across the entries of the n-gram dataset to determine the third numerical measure, wherein each entry of the n-gram dataset includes an English word n-gram and an associated statistical association score, the searching of each multiword sequence comprising comparing the multi-word sequence of the constructed response to English word n-grams of the n-gram dataset to determine a matching entry of the n-gram dataset, the statistical association score for the matching entry indicating a probability of the multi-word sequence appearing in a well-formed text; and applying a numerical, computer-based scoring model to the first numerical measure, the second numerical measure, and the third numerical measure to automatically determine a score for the constructed response indicative of the user's English language proficiency, the numerical, computer-based scoring model including a first variable and an associated first weighting factor, the first variable receiving a value of the first numerical measure, a second variable and an associated second weighting factor, the second variable receiving a value of the second numerical measure, and a third variable and an associated third weighting factor, the third variable receiving a value of the third numerical measure.

7. The system of claim 6, wherein the processing system, in the determining of the second numerical measure, is configured to execute steps comprising:

processing the set of individual words and a lexical database to generate an expanded set of individual words, the expanded set comprising synonyms, hyponyms, or hypernyms of the individual words;

processing the reference corpus and the lexical database to generate an expanded reference corpus, the expanded reference corpus comprising synonyms, hyponyms, or hypernyms of individual words included in the reference corpus;

determining a first metric for the constructed response, the first metric indicating a percentage of words of the set of individual words that are included in the reference corpus; and determining a second metric for the constructed response, the second metric indicating a percentage of words of the expanded set of individual words that are included in the expanded reference corpus.

8. The system of claim 6, wherein the plurality of multi-word sequences include adjacent word pairs and adjacent word triples, and wherein the processing system, in the determining of the third numerical measure, is configured to execute steps comprising:
- determining a Pointwise Mutual Information (PMI) value for each adjacent word pair of the plurality of multi-word sequences, the determining of the PMI value for an adjacent word pair comprising:
  - determining a probability p(AB) of the adjacent word pair appearing in a well-formed text based on the n-gram dataset,
  - determining probabilities p(A) and p(B) of first and second words, respectively, of the adjacent word pair appearing in a well-formed text based on the n-gram dataset, and determining the PMI value for the adjacent word pair based on $$\log_2 \frac{p(AB)}{p(A) \cdot p(B)};$$

- determining a PMI value for each adjacent word triple of the plurality of multi-word sequences, the determining of the PMI value for an adjacent word triple comprising:
  - determining a probability p(A'B'C') of the adjacent word triple appearing in a wellformed text based on the n-gram dataset,
  - determining probabilities p(A'), p(B'), and p(C') of first, second, and third words, respectively, of the adjacent word triple appearing in a well-formed text based on the n-gram dataset, and
  - determining the PMI value for the adjacent word triple based on $$\log_2 \frac{p(A'B'C')}{p(A') \cdot p(B') \cdot p(C')};$$

and
- processing the PMI values for the adjacent word pairs and the adjacent word triples with the processing system to determine the third numerical measure.

9. The system of claim 8, wherein the processing system, in the processing of the PMI values for the adjacent word pairs and the adjacent word triples to determine the third numerical measure, is configured to execute steps comprising:
- assigning each of the PMI values for the adjacent word pairs and the adjacent word triples to one of a plurality of bins, each of the bins being associated with a range of PMI values;
- determining a first metric for the constructed response, the first metric indicating, for each of the bins, a number of PMI values for the adjacent word pairs assigned to the bin;
- determining a second metric for the constructed response, the second metric indicating, for each of the bins, a percentage of the PMI values for the adjacent word pairs assigned to the bin;
- determining a third metric for the constructed response, the third metric indicating, for each of the bins, a number of PMI values for the adjacent word triples assigned to the bin; and
- determining a fourth metric for the constructed response, the fourth metric indicating, for each of the bins, a percentage of the PMI values for the adjacent word triples assigned to the bin.

10. The system of claim 6, wherein the plurality of multi-word sequences include adjacent word pairs, and wherein the processing system is configured to execute steps comprising:
- determining a Pointwise Mutual Information (PMI) value for each adjacent word pair of the plurality of multi-word sequences, the determining of the PMI value for an adjacent word pair comprising:
  - determining a probability p(AB) of the adjacent word pair appearing in a well-formed text based on the n-gram dataset,
  - determining probabilities p(A) and p(B) of first and second words, respectively, of the adjacent word pair appearing in a well-formed text based on the n-gram dataset, and
  - determining the PMI value for the adjacent word pair based on $$\log_2 \frac{p(AB)}{p(A) \cdot p(B)};$$

- determining an average PMI value for the constructed response based on the PMI values;
- determining that the average PMI value meets or exceeds a threshold PMI value, wherein a constructed response with an average PMI value that meets or exceeds the threshold PMI value is designated as likely being in the English language, and wherein a constructed response with an average PMI value that is below the threshold PMI value is designated as not likely being in the English language; and
- in response to the determining that the average PMI value meets or exceeds the threshold PMI value, performing the steps to determine the first, second, and third numerical measures and the score for the constructed response.

11. A non-transitory computer-readable storage medium for measuring a user's English language proficiency, the computer-readable storage medium comprising computer executable instructions which, when executed, cause a processing system to execute steps comprising:
- receiving a constructed response generated by a user, the constructed response being based on a picture;
- parsing the constructed response to generate a set of individual words associated with the constructed response;
- processing the constructed response to identify in the constructed response a plurality of multi-word sequences, each multi-word sequence comprising a sequence of two or more adjacent words in the constructed response;
- processing the constructed response to determine a first numerical measure indicative of a presence of one or more grammar errors included in the constructed response;
- processing the set of individual words and a reference corpus to determine a second numerical measure indicative of a degree to which the constructed response describes a subject matter of the picture, each word of the set of individual words being compared to individual words of the reference corpus to determine the second numerical measure, the reference corpus having been designated as representative of the subject matter;

processing the plurality of multi-word sequences of the constructed response and an n-gram database comprising a plurality of entries to determine a third numerical measure indicative of a degree of awkward word usage in the constructed response, each of the multi-word sequences of the constructed response being searched across the entries of the n-gram dataset to determine the third numerical measure, wherein each entry of the n-gram dataset includes an English word n-gram and an associated statistical association score, the searching of each multi-word sequence comprising comparing the multi-word sequence of the constructed response to English word n-grams of the n-gram dataset to determine a matching entry of the n-gram dataset, the statistical association score for the matching entry indicating a probability of the multi-word sequence appearing in a well-formed text; and applying a numerical, computer-based scoring model to the first numerical measure, the second numerical measure, and the third numerical measure to automatically determine a score for the constructed response indicative of the user's English language proficiency, the numerical, computer-based scoring model including a first variable and an associated first weighting factor, the first variable receiving a value of the first numerical measure, a second variable and an associated second weighting factor, the second variable receiving a value of the second numerical measure, and a third variable and an associated third weighting factor, the third variable receiving a value of the third numerical measure.

12. The non-transitory computer-readable storage medium of claim 11, wherein the processing system, in the determining of the second numerical measure, is configured to execute steps comprising:

processing the set of individual words and a lexical database to generate an expanded set of individual words, the expanded set comprising synonyms, hyponyms, or hypernyms of the individual words;

processing the reference corpus and the lexical database to generate an expanded reference corpus, the expanded reference corpus comprising synonyms, hyponyms, or hypernyms of individual words included in the reference corpus;

determining a first metric for the constructed response, the first metric indicating a percentage of words of the set of individual words that are included in the reference corpus; and determining a second metric for the constructed response, the second metric indicating a percentage of words of the expanded set of individual words that are included in the expanded reference corpus.

13. The non-transitory computer-readable storage medium of claim 11, wherein the plurality of multi-word sequences include adjacent word pairs and adjacent word triples, and wherein the processing system, in the determining of the third numerical measure, is configured to execute steps comprising:

determining a Pointwise Mutual Information (PMI) value for each adjacent word pair of the plurality of multi-word sequences, the determining of the PMI value for an adjacent word pair comprising:

determining a probability p(AB) of the adjacent word pair appearing in a well-formed text based on the n-gram dataset, determining probabilities p(A) and p(B) of first and second words, respectively, of the adjacent word pair appearing in a well-formed text based on the n-gram dataset, and determining the PMI value for the adjacent word pair based on $$\log_2 \frac{p(AB)}{p(A) \cdot p(B)};$$

determining a PMI value for each adjacent word triple of the plurality of multi-word sequences, the determining of the PMI value for an adjacent word triple comprising:

determining a probability p(A'B'C') of the adjacent word triple appearing in a wellformed text based on the n-gram dataset, determining probabilities p(A'), p(B'), and p(C') of first, second, and third words, respectively, of the adjacent word triple appearing in a well-formed text based on the n-gram dataset, and determining the PMI value for the adjacent word triple based on $$\log_2 \frac{p(A'B'C')}{p(A') \cdot p(B') \cdot p(C')};$$

and processing the PMI values for the adjacent word pairs and the adjacent word triples with the processing system to determine the third numerical measure.

14. The non-transitory computer-readable storage medium of claim 13, wherein the processing system, in the processing of the PMI values for the adjacent word pairs and the adjacent word triples to determine the third numerical measure, is configured to execute steps comprising:

assigning each of the PMI values for the adjacent word pairs and the adjacent word triples to one of a plurality of bins, each of the bins being associated with a range of PMI values;

determining a first metric for the constructed response, the first metric indicating, for each of the bins, a number of PMI values for the adjacent word pairs assigned to the bin;

determining a second metric for the constructed response, the second metric indicating, for each of the bins, a percentage of the PMI values for the adjacent word pairs assigned to the bin;

determining a third metric for the constructed response, the third metric indicating, for each of the bins, a number of PMI values for the adjacent word triples assigned to the bin; and determining a fourth metric for the constructed response, the fourth metric indicating, for each of the bins, a percentage of the PMI values for the adjacent word triples assigned to the bin.

15. The non-transitory computer-readable storage medium of claim 11, wherein the plurality of multi-word sequences include adjacent word pairs, and wherein the processing system is configured to execute steps comprising:

determining a Pointwise Mutual Information (PMI) value for each adjacent word pair of the plurality of multiword sequences, the determining of the PMI value for an adjacent word pair comprising:

determining a probability p(AB) of the adjacent word pair appearing in a well-formed text based on the n-gram dataset, determining probabilities p(A) and p(B) of first and second words, respectively, of the adjacent word pair appearing in a well-formed text based on the n-gram dataset, and determining the PMI value for the adjacent word pair based on $$\log_2 \frac{p(AB)}{p(A) \cdot p(B)};$$

determining an average PMI value for the constructed response based on the PMI values;

determining that the average PMI value meets or exceeds a threshold PMI value, wherein a constructed response with an average PMI value that meets or exceeds the threshold PMI value is designated as likely being in the English language, and wherein a constructed response with an average PMI value that is below the threshold PMI value is designated as not likely being in the English language; and in response to the determining that the average PMI value meets or exceeds the threshold PMI value, performing the steps to determine the first, second, and third numerical measures and the score for the constructed response.

* * * * *